(12) United States Patent
Shahrzad et al.

(10) Patent No.: US 11,775,841 B2
(45) Date of Patent: Oct. 3, 2023

(54) PROCESS AND SYSTEM INCLUDING EXPLAINABLE PRESCRIPTIONS THROUGH SURROGATE-ASSISTED EVOLUTION

(71) Applicant: Cognizant Technology Solutions U.S. Corporation, College Station, TX (US)

(72) Inventors: Hormoz Shahrzad, Dublin, CA (US); Babak Hodjat, Dublin, CA (US)

(*) Notice: Subject to any disclaimer, the term of this patent is extended or adjusted under 35 U.S.C. 154(b) by 656 days.

(21) Appl. No.: 16/902,013

(22) Filed: Jun. 15, 2020

(65) Prior Publication Data
US 2021/0390417 A1    Dec. 16, 2021

(51) Int. Cl.
*G06N 3/08* (2023.01)
*G06N 3/126* (2023.01)
*G06N 20/00* (2019.01)
*G06N 3/086* (2023.01)
*G06F 18/20* (2023.01)

(52) U.S. Cl.
CPC .......... *G06N 3/126* (2013.01); *G06F 18/285* (2023.01); *G06N 3/086* (2013.01); *G06N 20/00* (2019.01)

(58) Field of Classification Search
None
See application file for complete search history.

(56) References Cited

U.S. PATENT DOCUMENTS

| | | |
|---|---|---|
| 5,140,530 A | 8/1992 | Guha |
| 5,761,381 A | 6/1998 | Arci |
| 5,845,266 A | 12/1998 | Lupien et al. |
| 5,920,848 A | 7/1999 | Schutzer et al. |
| 5,930,780 A | 7/1999 | Hughes et al. |
| 6,240,399 B1 | 5/2001 | Frank et al. |
| 6,249,783 B1 | 6/2001 | Crone et al. |
| 6,941,287 B1 | 9/2005 | Vaidyanathan |
| 7,013,344 B2 | 3/2006 | Megiddo |
| 7,246,075 B1 | 7/2007 | Testa |
| 7,370,013 B1 | 5/2008 | Aziz et al. |
| 7,444,309 B2 | 10/2008 | Branke et al. |
| 8,065,244 B2 | 11/2011 | Chen et al. |
| 8,527,433 B2 | 9/2013 | Hodjat et al. |
| 8,639,545 B2 | 1/2014 | Cases |
| 8,768,811 B2 | 7/2014 | Hodjat et al. |

(Continued)

FOREIGN PATENT DOCUMENTS

| | | |
|---|---|---|
| EP | 0762294 A2 | 3/1997 |
| EP | 2422276 | 2/2012 |

(Continued)

OTHER PUBLICATIONS

Pan et al ("A Classification-Based Surrogate-Assisted Evolutionary Algorithm for Expensive Many-objective Optimization" Feb. 2019) (Year: 2019).*

(Continued)

*Primary Examiner* — Lut Wong
(74) *Attorney, Agent, or Firm* — Dawn-Marie Bey; Bey & Cotropia PLLC (57) ABSTRACT

An explainable surrogate-assisted evolutionary optimization method, E-ESP, discovers rule-based decision strategies for which actions to take to achieve certain outcomes when historical training data is limited or unavailable. The resulting rules are human readable and thus facilitate explainability and trustworthiness unlike the black box solutions resulting from neural network solutions.

11 Claims, 6 Drawing Sheets

(56) References Cited

U.S. PATENT DOCUMENTS

| | | |
|---|---|---|
| 8,775,341 B1 | 7/2014 | Commons |
| 8,825,560 B2 | 9/2014 | Hodjat |
| 8,909,570 B1 | 12/2014 | Hodjat et al. |
| 8,918,349 B2 | 12/2014 | Hodjat et al. |
| 8,977,581 B1 | 3/2015 | Hodjat et al. |
| 9,002,759 B2 | 4/2015 | Hodjat et al. |
| 9,015,093 B1 | 4/2015 | Commons |
| 9,053,431 B1 | 6/2015 | Commons |
| 9,466,023 B1 | 10/2016 | Shahrzad et al. |
| 9,489,630 B2 | 11/2016 | Achin et al. |
| 9,785,886 B1 | 10/2017 | Andoni |
| 10,255,529 B2 | 4/2019 | Rabinovich |
| 10,268,953 B1 | 4/2019 | Fink et al. |
| 10,430,709 B2 | 10/2019 | Shahrzad et al. |
| 10,699,194 B2 | 6/2020 | David |
| 10,970,441 B1 | 4/2021 | Zhang |
| 11,003,997 B1 | 5/2021 | Blackwood |
| 2002/0019844 A1 | 2/2002 | Kurowski et al. |
| 2002/0080169 A1 | 6/2002 | Diederiks |
| 2003/0014379 A1 | 1/2003 | Saias |
| 2003/0149603 A1 | 8/2003 | Ferguson et al. |
| 2003/0158887 A1 | 8/2003 | Megiddo |
| 2004/0143559 A1 | 7/2004 | Ayala |
| 2004/0210545 A1 | 10/2004 | Branke et al. |
| 2004/0254901 A1 | 12/2004 | Bonabeau et al. |
| 2005/0033672 A1 | 2/2005 | Lasry et al. |
| 2005/0136480 A1 | 6/2005 | Brahmachari |
| 2005/0187848 A1 | 8/2005 | Bonissone et al. |
| 2005/0197875 A1 | 9/2005 | Kauffman |
| 2005/0198103 A1 | 9/2005 | Ching |
| 2006/0218107 A1 | 9/2006 | Young |
| 2006/0247973 A1 | 11/2006 | Mueller |
| 2007/0094161 A1 | 4/2007 | Calabro |
| 2007/0100907 A1 | 5/2007 | Bayer |
| 2007/0143198 A1 | 6/2007 | Brandes et al. |
| 2007/0143759 A1 | 6/2007 | Ozgur et al. |
| 2007/0150435 A1 | 6/2007 | Murakawa |
| 2007/0185990 A1 | 8/2007 | Ono et al. |
| 2008/0071588 A1 | 3/2008 | Eder |
| 2008/0228644 A1 | 9/2008 | Birkestrand et al. |
| 2009/0125370 A1 | 5/2009 | Blondeau et al. |
| 2009/0307638 A1 | 12/2009 | Mcconaghy |
| 2009/0327178 A1 | 12/2009 | Jacobson |
| 2010/0018293 A1 | 1/2010 | Monkowski |
| 2010/0030720 A1 | 2/2010 | Stephens |
| 2010/0111991 A1 | 5/2010 | Raitano |
| 2010/0182935 A1 | 7/2010 | David |
| 2010/0256795 A1 | 10/2010 | Mclaughlin |
| 2010/0257228 A1 | 10/2010 | Staggs |
| 2010/0257605 A1 | 10/2010 | Mclaughlin |
| 2010/0274736 A1 | 10/2010 | Hodjat et al. |
| 2010/0274742 A1 | 10/2010 | Hodjat et al. |
| 2010/0293119 A1 | 11/2010 | Ferringer et al. |
| 2011/0040596 A1 | 2/2011 | Chen |
| 2011/0161264 A1 | 6/2011 | Cantin |
| 2011/0246834 A1 | 10/2011 | Rajashekara |
| 2012/0239517 A1 | 9/2012 | Blondeau |
| 2012/0239592 A1 | 9/2012 | Esbensen |
| 2012/0313798 A1 | 12/2012 | Markram |
| 2013/0006901 A1 | 1/2013 | Cantin |
| 2013/0124440 A1 | 5/2013 | Hodjat et al. |
| 2013/0138436 A1 | 5/2013 | Yu |
| 2013/0254142 A1 | 9/2013 | Hodjat |
| 2013/0311412 A1 | 11/2013 | Lazar |
| 2014/0006316 A1 | 1/2014 | Hodjat |
| 2014/0011982 A1 | 1/2014 | Marasco |
| 2014/0019388 A1 | 1/2014 | Kingsbury |
| 2014/0229362 A1 | 8/2014 | Hodjat |
| 2015/0046181 A1 | 2/2015 | Adjaoute |
| 2015/0136602 A1 | 5/2015 | Jovanovich |
| 2015/0288573 A1 | 10/2015 | Baughman |
| 2015/0331908 A1 | 11/2015 | Duffy |
| 2015/0356461 A1 | 12/2015 | Vinyals |
| 2016/0048753 A1 | 2/2016 | Sussillo |
| 2016/0063359 A1 | 3/2016 | Szegedy |
| 2016/0232445 A1 | 8/2016 | Srinivasan |
| 2016/0242690 A1 | 8/2016 | Principe |
| 2016/0283563 A1 | 9/2016 | Hodjat |
| 2016/0328253 A1 | 11/2016 | Majumdar |
| 2016/0329047 A1 | 11/2016 | Tur |
| 2016/0329407 A1 | 11/2016 | Takemura |
| 2016/0350671 A1 | 12/2016 | Morris, II et al. |
| 2016/0364522 A1 | 12/2016 | Frey |
| 2017/0001093 A1 | 1/2017 | Mollice |
| 2017/0060963 A1 | 3/2017 | Whittaker |
| 2017/0063908 A1 | 3/2017 | Muddu |
| 2017/0109355 A1 | 4/2017 | Li |
| 2017/0116520 A1 | 4/2017 | Min |
| 2017/0132528 A1 | 5/2017 | Aslan |
| 2017/0148433 A1 | 5/2017 | Catanzaro |
| 2017/0192638 A1 | 7/2017 | Iscoe |
| 2017/0193366 A1 | 7/2017 | Miikkulainen |
| 2017/0193367 A1 | 7/2017 | Miikkulainen |
| 2017/0193403 A1 | 7/2017 | Iscoe |
| 2017/0213156 A1 | 7/2017 | Hammond |
| 2017/0256254 A1 | 9/2017 | Huang |
| 2017/0262737 A1 | 9/2017 | Rabinovich |
| 2017/0270225 A1 | 9/2017 | Chen et al. |
| 2017/0293849 A1 | 10/2017 | Hodjat et al. |
| 2017/0323219 A1 | 11/2017 | Shahrzad |
| 2017/0323636 A1 | 11/2017 | Xiao |
| 2018/0018590 A1 | 1/2018 | Szeto |
| 2018/0053092 A1 | 2/2018 | Hajizadeh |
| 2018/0114115 A1 | 4/2018 | Liang |
| 2018/0114116 A1 | 4/2018 | Liang |
| 2018/0157972 A1 | 6/2018 | Hu |
| 2018/0240041 A1 | 8/2018 | Koch |
| 2018/0293498 A1 | 10/2018 | Campos |
| 2018/0357552 A1 | 12/2018 | Campos |
| 2018/0365557 A1 | 12/2018 | Kobayashi |
| 2018/0365564 A1 | 12/2018 | Huang |
| 2019/0065954 A1 | 2/2019 | Bittner, Jr. |
| 2019/0147298 A1 | 5/2019 | Rabinovich |
| 2019/0244108 A1 | 8/2019 | Meyerson |
| 2019/0332678 A1 | 10/2019 | Ishida |
| 2020/0311556 A1* | 10/2020 | Francon ................. G06N 3/042 |

FOREIGN PATENT DOCUMENTS

| | | |
|---|---|---|
| EP | 2422278 | 2/2012 |
| JP | H0810804 | 1/1996 |
| JP | 08-110804 | 4/1996 |
| JP | H09114797 A | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 A | 7/2005 |
| JP | 2007052247 | 3/2007 |
| JP | 2007207173 | 8/2007 |
| JP | 2007522547 | 8/2007 |
| JP | 2008129984 A | 6/2008 |
| WO | WO 2005/073854 | 8/2005 |
| WO | 2010120440 A2 | 10/2010 |
| WO | WO 2010/127039 | 11/2010 |
| WO | WO 2010/127042 | 11/2010 |
| WO | 2017161233 | 9/2017 |
| WO | 2018211138 | 11/2018 |
| WO | 2018213840 | 11/2018 |
| WO | 2018223822 A1 | 12/2018 |
| WO | 2019081705 | 5/2019 |
| WO | WO 2019/217876 | 11/2019 |

OTHER PUBLICATIONS

Manríquez et al ("A Review of Surrogate Assisted Multiobjective Evolutionary Algorithms" 2016) (Year: 2016).*

Miikkulainen et al., "From Prediction to Prescription: Evolutionary Optimization of Non-Pharmaceutical Interventions in the COVID-19 Pandemic", arxiv.org, Aug. 1, 2020, retrieved on [Oct. 11, 2022]. Retrieved from the internet <URL: https://arxiv.org/pdf/2005.13766.pdf>.

(56) References Cited

OTHER PUBLICATIONS

Miikkulainen, Risto, et al., "Evolving Deep Neural Networks," Mar. 4, 2017, 8 pp.

Minsoo Kang, et al., "Towards Oracle Knowledge Distillation With Neural Architecture Search," arXiv: 1911.13019vl, Nov. 29, 2019, 9 pp.

Misra et al., "Cross-stitch networks for multi-task learning," In Proceedings of the IEEE Conference on Computer Vision and Pattern Recognition, pp. 3994-4003. 2016.

Moriarty etal., "Hierarchical Evolution of Neural Networks", IEEE (1998). (Year: 1998) 6 pages.

Moriarty, David E., et al., "Forming neural networks through efficient and adaptive coevolution," Evolutionary Computation 5.4, 28 pages, 1997.

N. Hansen, et al, "Adapting arbitrary normal mutation distributions in evolution strategies:The covariance matrix adaptation," In Proceedings of IEEE International Conference on Evolutionary Computation, pp. 312-317, IEEE, 1996.

N. Hansen, et al., "Evaluating the CMA evolution strategy on multimodal test functions," International Conference on Parallel Problem Solving from Nature, Springer, pp. 282-291, 2004.

Notice of Allowance for U.S. Appl. No. 13/358,381, dated Nov. 19, 2014, 5 pp.

Notice of Allowance for U.S. Appl. No. 13/540,507, dated Oct. 31, 2014, 9 pp.

O'Reilly et al., "EC-Star: A Massive-Scale, Hub and Spoke, Distributed Genetic Programming System", In: Riolo etal, Genetic Programming Theory and Practice X, Apr. 19, 2013, Genetic and Evolutionary Computation, pp. 73-85 (Year: 2013).

Oreski et al., Hybrid system with genetic algorithm and artificial neural networks and its application to retail credit risk assessment, Expert Systems with Applications 39 (2012); pp. 12605-12617 (Year: 2012).

Pantridge et al., Evolution of Layer Based Neural Networks: Preliminary Report, GECCO '16, pp. 1015-1022, Jul. 2016. (Year: 2016).

Paul Micaelli, et al., "Zero-Shot Knowledge Transfer via Adversarial Belief Matching," 33rd Conference on Neural Information Processing Systems, (NEURIPS 2019), Vancouver, CA, arXiv: 1905.09768v4, Nov. 25, 2019, 13 pp.

Pouya Bashivan, et al., "Teacher Guided Architecture Search," arXiv: 1808.01405v3, Sep. 6, 2019, 15pp.

R. Miikkulainen, J. Liang, E. Meyerson, et al., 2017, "Evolving Deep Neural Networks," CoRR, abs/1703.00548, Mar. 2017. 73 pages.

R. Poli, W. B. Langdon, N. F. McPhee, J. R. Koza, "Genetic programming: An introductory tutorial and a survey of techniques and applications", University of Essex, School of Computer Science and Electronic Engineering, Technical Report, (Oct. 2007), No. CES-475, ISSN 1744-8050, XP055038163.

Raphael Gontijo Lopes, et al., "Data-Free Knowledge Distillation for Deep Neural Networks," arXiv: 1710.07535v2, Nov. 23, 2017, 8 pp.

Rennie, Annealed dropout training of deep networks, 2014 IEEE Spoken Language Technology Workshop (SLT) 2014 (Year: 2014) 6 pages.

Risto Miikkulaiiien, "Evolving Multitask Neural Network Structure," The University of Texas at Austin and Sentient Technologies. Inc .Aug. 26. 2013, 22 pages.

Risto Miikkulainen, "Creative AI Through Evolutionary Computation: Principles and Examples," SN Computer Science, 2:163, 2021, https://do1.org/10,1007/s42979-021-00540-9, 7 pp.

Risto Miikkulainen, "From Prediction to Prescription: Evolutionary Optimization of Non-Pharmaceutical Interventions in the COVID-19 Pandemic," arXiv: 2005.13766v3, Aug. 1, 2020, 34 pp.

Risto Miikkulainen, et al., "From Prediction to Prescription: Evolutionary Optimization of Nonpharmaceutical Interventions in the COVID-19 Pandemic," IEEE Transactions on Evolutionary Computation, vol. 25, No. 2, Apr. 2021, 16 pp.

Rosenbaum, et al., "Routing Networks: Adaptive Selection of Non-Linear Functions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2. 16 pages.

Ruder, "An Overview of Multi-Task Learning in Deep Neural Networks," In: Cornell University Library /Computer Science/ Machine Learning, Jun. 15, 2017 [online] [retrieved on Mar. 15, 2019], Retrieved from the Internet: https://arxrv.org/abs/1706.05098, 14 pages.

Salge, C., et al., "Empowerment—An Introduction," published in Guided Self-Organization: Inception, Chap 4, University of Hertfordshire, Copyright 2014, pp. 67-114.

Santiago Gonzalez, "Loss Function Optimization Using Evolutionary Computation and Multivariate Function Approximators, Particularly Multivariate Taylor Expansions," 5 pp., Aug. 22, 2019.

Santiago Gonzalez, et al., "Improved Training Speed, Accuracy, and Data Utilization Through Loss Function Optimization," Version 1, arXiv: 1905.11528v1, dated May 27, 2019. 10 pages.

Santiago Gonzalez, et al., "Improved Training Speed, Accuracy, and Data Utilization Through Loss Function Optimization," Version 2, arXiv: 1905.11528v2, dated Feb. 10, 2020. 7 pages.

Santiago Gonzalez, et al., "Improved Training Speed, Accuracy, and Data Utilization Through Loss Function Optimization," Version 3, arXiv: 1905.11528v3, dated Apr. 27, 2020. 7 pages.

Scott, E. O., et al., "Understanding Simple Asynchronous Evolutionary Algorithms," Jan. 17-20, 2015, 15 pp.

Secretan, J., et al., "Picbreeder: A Case Study in Collaborative Evolutionary Exploration of Design Space," Evolutionary Computation journal, MIT Press, Copyright 2011, 30 pages.

Shahrzad, et al., "Tackling the Boolean Multiplexer Function Using a Highly Distributed Genetic Programming System," in Genetic Programming Theory and Practice XII, 7 pp., 2015.

Shazeer et al., "Outrageously large neural networks: The sparsely-gated mixiure-of-experts layer," arXiv preprint arXiv:1701.08538 (2017), 19 pages.

Shi, 2008, "An Empirical Comparison of Evolution and Coevolution for Designing Artificial Neural Network Game Players" (Year: 2008).

Snoek, et al., "Scalable Bayesian Optimization Using Deep Neural Networks", 2015, 13 pages.

Stanley et al. "Evolving neural networks through augmenting topologies." Evolutionary computation 10.2, 29 pages (2002) (Year: 2002).

Stanley et al., Why greatness cannot be planned: the myth of the objective, Genet. Program Evolvable Mach.,m16:559-561, 2015.

Stanley, 2002, "Evolving Neural Networks Through Augmenting Topologies" (Year: 2002).

Stanley, et al., "Why Greatness Cannot Be Planned: The Myth of the Objective," New York, NY, Springer (2015). 2 pages.

Stanley, Kenneth O., et al., "Real-Time Evolution of Neural Networks in the Nero Video Game," AAAI, vol. 6, 2006, 4 pp.

Storsveen et al, 2008, "Evolving a 2D Model of an Eye using CPPNs" (Year: 2008).

Supplementary European Search Report dated Oct. 12, 2012 in EP 10770288, 12 pages.

Supplementary European Search Report dated Oct. 9, 2012 in EP 107702871, 11 pages.

Timothy Hospedales, et al., "Meta-Learning in Neural Networks: A Survey," arXiv: 2004.05439vl, Apr. 11, 2020, 23 pp.

U.S. Appl. No. 13/184,307—Notice of Allowance dated Aug. 4, 2014, 9 pages.

U.S. Appl. No. 13/184,307—Office Action dated Oct. 21, 2013, 16 pages.

U.S. Appl. No. 14/595,991—Final Office Action dated Feb. 27, 2018, 25 pages.

U.S. Appl. No. 14/595,991—Response to Final Office Action dated Feb. 27, 2018, filed May 22, 2018, 32 pages.

U.S. Appl. No. 14/595,991—Response to Final Office Action dated Feb. 27, 2018, filed Jul. 27, 2018, 41 pages.

Anooj, "Clinical decision support system: Risk level prediction of heart disease using weighted fuzzy rules", 2012 (Year: 2012). 14 pages.

(56) References Cited

OTHER PUBLICATIONS

Ares "A soft computing framework for classifying time series based on fuzzy sets of events", 2015 (Year: 2015). 20 pages.
Berg "Fuzzy Classification Using Probability-Based Rule Weighting", IEEE, 2002 (Year: 2002). 6 pages.
Davarynejad, "Fuzzy Fitness Granulation in Evolutionary Algorithms for complex optimization," Master of Science Thesis, Ferdowsi Univ. of Mashhad, Jun. 2007, 30 pages.
Freitas, A. "A review of evolutionary algorithms for data mining." Soft Computing for Knowledge Discovery and Data Mining. Springer US, 2008. 79-111.
Galea, "Iterative vs Simultaneous Fuzzy Rule Induction", IEEE, 2005 (Year: 2005). 6 pages.
Ishibuchi, "Three-objective genetics-based machine learning for linguistic rule extraction", IEEE, 2005 (Year: 2005). 25 pages.
Juille, H., "Evolution of Non-Deterministic Incremental Algorithms as a New Approach for Search in State Spaces," Proc. 6th Int'l. Conf. on Genetic Algorithms, 1995 8 pp.
Kosorukoff, A. "Using incremental evaluation and adaptive choice of operators in a genetic algorithm," Proc. Genetic and Evolutionary Computation Conference, GECCO—Sep. 2002, 7pp.
Kwedlo, "Learning Decision Rules Using a Distributed Evolutionary Algorithm", 2002 (Year: 2002). 10 pages.
Lahsasna, "Design of a Fuzzy-based Decision Support System for Coronary Heart Disease Diagnosis", (Year: 2012). 14 pages.
Lopez Haimes et al., "MRMOGA: parallel evolutionary multiobjective optimization using multiple resolutions," In: Proceedings of IEEE Congress on Evolutionary Computation, 2294-2301, 2005.
Sanchez, "Advocating the Use of Imprecisely Observed Data in Genetic Fuzzy Systems", IEEE, 2007 (Year: 2007). 12 pages.
Torresen, "A Dynamic Fitness Function Applied to Improve the Generalisation when Evolving a Signal Processing Hardware Architecture," Proc. EvoWorkshops 2002, 267-299 (12 pp).
U.S. Appl. No. 13/358,381—Office Action dated Jul. 8, 2014, 30 pages.
U.S. Appl. No. 13/540,507—Office Action dated Sep. 9, 2014, 25 pages.
Alejandro Barredo Arrietz, et al., "Explainable Artificial Intelligence (XAI): Concepts, Taxonomies, Opportunities and Challenges Toward Responsible AI," https://arxiv.org/pdf/1910.10045.pdf, 2019.
European Parliamentary Research Service, "Understanding Algorithmic Decision-Making: Opportunities and Challenges," https://www.europarl.europa.eu/RegData/etudes/STUD/2019/624261/EPRS_STU(2019)624261_EN.pdf, 2019.
Blen M. Keneni, "Evolving Rule Based Explainable Artificial Intelligence for Decision Support System of Unmanned Aerial Vehicles," Evolving_Rule_Based_Explainable_Artificial_Intelli.pdf, 2018.
Riccardo Guidotti, et al., "A Survey of Methods for Explaining Black Box Models," https://dl.acm.org/doi/fullHtml/10.1145/3236009, 2018.
Ilya Loshchilov, "Surrogate-Assisted Evolutionary Algorithms," https://tel.archives-ouvertes.fr/tel-00823881/document, 2013.
Alan Diaz-Manriquez, et al., "A Review of Surrogate Assisted Multiobjective Evolutionary Algorithms," http://downloads.hindawi.com/journals/cin/2016/9420460.pdf, 2016.
Erwan Le Merrer, et al., "The Bouncer Problem: Challenges to Remote Explainability," https://arxiv.org/pdf/1910.01432.pdf, 2020.
Alain Chabrier, IBM, "Explaining Decision Optimization Prescriptions," https://medium.com/ibm-watson/explaining-decision-optimization-prescriptions-7103abbc44e5, 2019.
Zhiwei Zeng, et al., "Context-Based and Explainable Decision Making With Argumentation," http://ifaamas.org/Proceedings/aamas2018/opdfs/p1114.pdf, 2018.
Jakob Bossek, et al., "One-Shot Decision-Making With and Without Surrogates," https://arxiv.org/pdf/1912.08956v1.pdf, 2019.
Cynthia Rudin, "Stop Explaining Black Box Machine Learning Models for High Stakes Decision and Use Interpretable Models Instead," https://www.nature.com/articles/s42256-019-0048-x, 2019.
Maribel Lopez, "Preparing for AI Ethics and Explainability in 2020," https://www.forbes.com/sites/maribellopez/2020/01/21/preparing-for-ai-ethics-and-explainability-in-2020/#15b37b022f6e, 2020.
Goodman, et al., "European Union (EU) regulations on algorithmic decision-making and a 'right to explanation,'" arXiv: 1606.08813v3, Aug. 2016.
Qiu, X. et al., Quantifying Point-Prediction Uncertainty in Neural Networks via Residual Estimation with an I/O Kernel, In Proceedings of the Eighth International Conference on Learning Representations (ICLR) (2020).
Hodjat, B. et al., PRETSL: Distributed Probabilistic Rule Evolution for Time-Series Classification, In Genetic Programming Theory and Practice XIV. Springer, 139-148 (2018).
Meyerson, E. et la., Discovering evolutionary stepping stones through behavior domination, In Proceedings of the Genetic and Evolutionary Computation Conference (GECCO 2017).
Miikkulainen, R. et al., Sentient ascend: AI-based massively multivariate conversion rate optimization. In Proceedings of the Thirtieth Innovative Applications of Artificial Intelligence Conference. AAAI (2018).
Miikkulainen et al., Ascend by Evolv: AI-Based Massively Multivariate Conversion Rate Optimization, AI Magazine (2019).
Johnson et al., "Flavor-Cyber-Agriculture: Optimization of plant metabolites in an open-source control environment through surrogate modeling," PLOS ONE (2019), https://doi.org/10.1371/journal.pone.0213918.
Stanley, K. et al, "Designing neural networks through neuroevolution" Nature Machine Intelligence, vol. 1, p. 24-35 (Jan. 2019).
Risto Miikkulainen, "Creative AI Through Evolutionary Computation," arXiv:1901.03775v2, Feb. 22, 2020.
Diesenroth, M. and Rasmussen, C. E., "PILCO: A model-based and data-efficient approach to policy search," In Proceedings of the $28^{th}$ International Conference on Machine Learning (ICML) (ICML '11), pp. 465-472, 2011.
Ha, D. and Schmidhuber, Jr., "Recurrent World Models Facilitate Policy Evolution," In Advances in Neural Information Processing Systems 32 (NIPS '18), Curran Associates, Inc., Red Hook, NY, USA, pp. 2455-2467, 2018.
Wahlström, N., Schön, T. B., and Deisenroth, M. P., "From pixels to torques: Policy learning with deep dynamical models," arXiv preprint arXiv: 1502.02251, 2015.
Mnih, V., Kavukcuoglu, K., Silver, D., Rusu, A. A., Veness, J., Bellemare, M. G., Graves, A., Riedmiller, M., Fidjeland, A. K., Ostrovski, G., and others, "Human-level control through deep reinforcement learning," Nature 518, 7540, pp. 529-533, 2015.
Hasselt, H. V., "Double Q-learning," In Advances in Neural Information Processing Systems 23, J. D. Lafferty, C. K. I. Williams, J. Shawe-Taylor, R. S. Zemel, and A. Culotta (Eds.), Curran Associates, Inc., pp. 2613-2621, 2010.
Wang, Z., Schaul, T., Hessel, M., Van Hasselt, H., Lanctot, M., and De Freitas, "Dueling Network Architectures for Deep Reinforcement Learning," In Proceedings of the $33^{rd}$ International Conference on Machine Learning (ICML) (ICML '16), vol. 48, JMLR org., 1995-2003.
Mnih, V., Badia, A. P., Mirza, M., Graves, A., Lillicrap, T., Harley, T., Silver, D., and Kavukcuoglu, "Asynchronous methods for deep reinforcement learning," (ICML) (ICML '16), pp. 1928-1937, 2016.
Schulman, J., Wolski, F., Dhariwal, P., Radford, A., and Klimov, O., "Proximal Policy Optimization Algorithms," CoRR abs/1707.06347, 2017.
Houthooft, R., Chen, Y., Isola, P., Stadie, B., Wolski, F., Ho, O. J., and Abbeel, P., "Evolved policy gradients," In Advances in Neural Information Processing Systems 31, Curran Associates, Inc., pp. 5400-5409, 2018.
Khadka, et al., "Evolution-Guided Policy Gradient in Reinforcement Learning," $32^{nd}$ Conference on Neural Information Processing Systems, 2018.
Pourchot, et al., "CEM-RL: Combining Evolutionary and Gradient-Based Methods for Policy Search," ICLR, 2019.
Application as filed for U.S. Appl. No. 16/424,686, filed May 29, 2019.

(56) References Cited

OTHER PUBLICATIONS

Application as filed for U.S. Appl. No. 16/502,439, filed Jul. 3, 2019.
Application as filed for U.S. Appl. No. 16/879,934, filed May 21, 2020.
Hodjat, et al., "Chapter 5: Introducing an Age-Varying Fitness Estimation Function," Genetic Programming Theory and Practice X, Ed. Riolo, et al., Springer, Apr. 19, 2013, pp. 59-71.
Li, Xiaodong and Kirley, Michael, "The Effects of Varying Population Density in a Fine-Grained Parallel Genetic Algorithm," 2002, CEC'02, Proceedings of the 2002 Congress on Evolutionary Computation, vol. 2, IEEE, 2002.
Fidelis, Marcos Vinicius, Heitor S. Lopes, and Alex A. Freitas, "Discovering Comprehensible Classification Rules With a Genetic Algorithm," Proceedings of the 2000 Congress on Evolutionary Computation, vol. 1, IEEE, 2000.
International Search Report and Written Opinion for PCT Application No. PCT/US2008/82876, dated Dec. 23, 2008, 8 pp.
Koza, J. R., "Genetic Programming: On the Programming of Computers by Means of Natural Selection," Dec. 1992, MIT Press, pp. 1-609.
Extended European Search Report for EP Application No. EP 08847214, 9 pp.
Enee, Gilles, et al., "Classifier Systems Evolving Multi-Agent System With Distributed Elitism," Proceedings of the 1999 Congress on Evolutionary Computation (CEC'99), vol. 3:6, Jul. 1999, pp. 1740-1746.
Tanev, I., et al., "Scalable Architecture for Parallel Distributed Implementation of Genetic Programming on Network of Workstations," J. Systems Architecture, vol. 47, Jul. 2001, pp. 557-572.
Streichert, F., "Introduction to Evolutionary Algorithms," paper to be presented Apr. 4, 2002 at the Frankfurt MathFinance Workshop, Mar. 30, 2002, Frankfurt, Germany, XP55038571, 22 p., Retrieved from the Internet: http://www.ra.cs.uni-tuegingen.de/mitarb/streiche/publications/Introduction_to_E_volutionary_Algorithms.pdf.
Written Opinion from Singapore Patent Office in related application SG 201003127-6, dated Jun. 16, 2011, 9 pp.
Exam Report for related application AU 2008323758, dated Apr. 20, 2012, 2 pp.
Sakauchi, et al., UNIFINE: A Next Generation Financial Solution System of Nihon Unisys Ltd., Technology Review Unisys, Japan, Nihon Unisys Ltd., Feb. 28, 2006, vol. 25, No. 4, pp. 14-15.
Office Action from JP 2010-533295, dated Apr. 16, 2013, 12 pp.
Laumanns, Marco, et al., "A Unified Model for Multi-Objective Evolutionary Algorithms with Elitism" IEEE, pp. 46-53, 2000.
Ahn, Change Wook, et al., "Elitism-Based Compact Genetic Algorithms," IEEE, Transactions on Evolutionary Computation, vol. 7, No. 4, pp. 367-385, 2003.
Hornby, Gregory S., "The Age-Layered Population Structure (ALPS) Evolutionary Algorithm," ACM, GECCO '09, 7 pp., 2009.
Hornby, G. S., "ALPS: The Age-Layered Population Structure for Reducing the Problem of Premature Convergence," GECCO '06, Seattle, Jul. 2006, authored by an employee of the U.S. Government, therefore not in the public domain, 8 pp.
Hornby, G. S. "A Steady-State Version of the Age-Layered Population Structure EA," Chapter 1 of Genetic Programming Theory and Practice VII, Riolo, et al., editors, Springer 2009, 16 pp.
Hornby, G. S., Steady-State ALPS for Real-Valued Problems, GECCO '09, Montreal, Jul. 2009, Assoc. of Computing Machinery, 8 pp.
Idesign lab, "ALPS—The Age-Layered Population Structure," UC Santa Cruz web article printed Mar. 17, 2011, 3 pp., http://idesign.ucsc.edu/projects/alsp.html.
Gaspar-Cunha, A., et al., "A Multi-Objective Evolutionary Algorithm Using Neural Networks to Approximate Fitness Evaluations," Intl'l. J. Computers, Systems and Signals, 6(1), pp. 18-36, 2005.
Nelson, A., "Fitness Functions in Evolutionary Robotics: A Survey and Analysis," Robotics and Autonomous Systems 57, 2009, 345-370.
Wu, A. S., et al., "An Incremental Fitness Function for Partitioning Parallel Tasks," Proc. Genetic and Evolutionary Computation Conf., Aug. 2001, 8 pp.
Whitehead, B. A., "Genetic Evolution of Radial Basis Function Coverage Using Orthogonal Niches," IEEE Transactions on Neural Networks, 7:6, Nov. 1996, 1525-28.
Bui, L. T., et al., "Local Models: An Approach to Distributed Multi-Objective Optimization," Computational Optimization and Applications, vol. 42, No. 1, Oct. 2007, pp. 105-139.
Castillo, Tapia M. G., et al., "Applications of Multi-Objective Evolutionary Algorithms in Economics and Finance: A Survey," Proc. IEEE Congress on Evolutionary Computation, Sep. 2007, pp. 532-539.
Ducheyne, E., et al., "Is Fitness Inheritance Useful for Real-World Applications?," Evolutionary Multi-Criterion Optimization, ser. LNCS 2631, Spring 2003, pp. 31-42.
Gopalakrishnan, G., et al., "Optimal Sampling in a Noisy Genetic Algorithm for Risk-Based Remediation Design," Bridging the Gap: Meeting the World's Water and Environmental Resources Challenges, Proc. World Water Congress, 2001, 8 pp.
Juille, H., "Evolution of Non-Deterministic Incremental Algorithms as a New Approach for Search in State Spaces," Proc. $6^{th}$ Int'l. Conf. on Genetic Algorithms, 1995 8 pp.
International Search Report dated Jul. 2, 2010 in PCT/US10/32847.
International Search Report dated Jun. 29, 2010 in PCT/US10/32841.
Sacks, J., et al., "Design and Analysis of Computer Experiments," Statistical Science, 4:4, 1989, 409-435.
Torresen, J., "A Dynamic Fitness Function Applied to Improve the Generalisation When Evolving a Signal Processing Hardware Architecture," Proc. EvoWorkshops, 2002, 267-299 (12 pp.).
Bartlett II, J. E., et al., "Organizational Research: Determining Appropriate Sample Size in Survey Research," IT, Learning, and Performance Journal, 19(1), Spring 2001, 8 pp.
Fitzpatrick, J. M., et al., "Genetic Algorithm in Noisy Environments," Machine Learning 3:101-120, May 1988.
Leon, C., et al., "Parallel Hypervolume-Guided Hyperheuristic for Adapting the Multi-Objective Evolutionary Island Model," Proc. $3^{rd}$ Int'l. Workshop on Nature Inspired Cooperative Strategies for Optimization Studies in Computational Intelligence, vol. 236, Nov. 2008, pp. 261-272.
Lopez, Jaimes A., et al., "MRMOGA: Parallel Evolutionary Multiobjective Optimization Using Multiple Resolutions," Proc. IEEE Congress on Evolutionary Computation, vol. 3, Sep. 2005, pp. 2294-2301.
Davarynejad, M., et al., "A Novel General Framework for Evolutionary Optimization: Adaptive Fuzzy Fitness Granulation," CEC, Sep. 2007, 6 pp.
Davarynejad, M., "Fuzzy Fitness Granulation in Evolutionary Algorithms For Complex Optimization," Master of Science Thesis, Ferdowsi Univ. of Mashhad, Jun. 2007, 30 pp.
Salami, M., et al., "A Fast Evaluation Strategy for Evolutionary Algorithms," Applied Soft Computing 2/3F (2003), 156-173.
M.-R. Akbarzadeh-T., et al., "Friendship Modeling for Cooperative Co-Evolutionary Fuzzy Systems: A Hybrid GA-GP Algorithm," Proc. $22^{nd}$ Int'l. Conf. of N. American FIPS, Jul. 2003, pp. 61-66.
Mouret, J. B., et al., "Encouraging Behavioral Diversity in Evolutionary Robotics: An Empirical Study," MIT, Evolutionary Computation, 20(1):91-133, 2012.
Myers, Raymond H. and Montgomery, Douglas C., "Response Surface Methodology: Process and Product Optimization Using Designed Experiments," John Wiley and Sons, Inc., New York, 1995.
Poli, R., et al., "Genetic Programming: An Introductory Tutorial and a Survey of Techniques and Applications," Univ. Essex School of Computer Science and Electronic Engineering Technical Report No. CES-475, Oct. 2007, 112 pp.
Georgilakis, P. S., "Genetic Algorithm Model for Profit Maximization of Generating Companies in Deregulated Electricity Markets," Applied Artificial Intelligence, Jul. 2009, 23:6, 538-552.
Refaeilzadeh, P., et al., "Cross Validation," entry, Encyclopedia of Database Systems, eds. Ozsu and Liu, Springer, 2009, 6 pp.

(56) References Cited

OTHER PUBLICATIONS

Remde, S., et al., "Evolution of Fitness Functions to Improve Heuristic Performance," LION, Dec. 8-10, 2007 II, LNCS 5313, pp. 206-219.
Schoreels, C., "Agent Based Genetic Algorithm Employing Financial Technical Analysis For Making Trading Decisions Using Historical Equity Market Data," IEEE/WIC/ACM International Conference on Intelligent Agent Technology (IAT2004), Beijing, China, Sep. 20-24, 2004, pp. 421-424.
Bongard, J. C., et al., "Guarding Against Premature Convergence While Accelerating Evolutionary Search," GECCO '10: Proceedings of the 12$^{th}$ Annual Conference on Genetic and Evolutionary Computation, 8 pp. (2010).
U.S. Appl. No. 13/184,307—Response dated Jan. 22, 2014, 19 pages.
U.S. Appl. No. 13/184,307—Response dated Jun. 23, 2014, 32 pages.
U.S. Appl. No. 13/358,381—Response dated Oct. 3, 2014, 21 pages.
U.S. Appl. No. 13/358,381—Amendment After Allowance filed Feb. 13, 2015, 20 pages.
U.S. Appl. No. 13/540,507—Response filed Oct. 15, 2014, 20 pages.
U.S. Appl. No. 13/895,238—Office Action dated Jan. 2, 2014, 17 pages.
U.S. Appl. No. 13/943,630—Amendment After Allowance dated Mar. 15, 2016, 16 pages.
U.S. Appl. No. 13/943,630—Notice of Allowance dated Jan. 21, 2016, 28 pages.
U.S. Appl. No. 13/943,630—Notice of Allowance dated May 19, 2016, 2 pages.
U.S. Appl. No. 13/943,630—Office Action dated May 27, 2015, 42 pages.
U.S. Appl. No. 13/943,630—Response to Office Action dated May 27, 2015 filed Sep. 23, 2015, 8 pages.
U.S. Appl. No. 13/945,630—Amendmend After Allowance dated Dec. 9, 2015, 7 pages.
U.S. Appl. No. 13/945,630—Final Office Action dated Aug. 4, 2015, 22 pages.
U.S. Appl. No. 13/945,630—Notice of Allowance dated Nov. 18, 2015, 8 pages.
U.S. Appl. No. 13/945,630—Office Action dated Mar. 12, 2015, 18 pages.
U.S. Appl. No. 13/945,630—Resonse to Office Action dated Mar. 12, 2015 filed Jul. 13, 2015, 9 pages.
U.S. Appl. No. 13/945,630—Response filed Nov. 4, 2015, 12 pp.
U.S. Appl. No. 14/014,063—Office Action dated May 7, 2014, 19 pages.
U.S. Appl. No. 14/539,908—Notice of Allowance dated Mar. 17, 2016, 15 pages.
U.S. Appl. No. 14/539,908—Office Action dated Oct. 1, 2015, 33 pages.
U.S. Appl. No. 14/539,908—Response filed Feb. 1, 2016, 18 pp.
U.S. Appl. No. 14/595,991—Office Action, dated Feb. 27, 2018, 19 pp.
U.S. Appl. No. 14/595,991—Response to Office Action dated May 10, 2017, filed Nov. 10, 2017, 29 pages.
U.S. Appl. No. 15/794,905, titled Evolution of Deep Neural Network Structures, 46 pages, filed Oct. 26, 2017.
U.S. Appl. No. 15/794,913 titled "Cooperative Evolution of Deep Neural Network Structures," filed Oct. 26, 2017.
U.S. Appl. No. 15/915,028, titled "Asynchronous Evaluation Strategy For Evolution of Deep Neural Networks," filed Mar. 3, 2018.
U.S. Appl. No. 62/468,224, titled "Asynchronous Evaluation Strategy For Evolution of Deep Neural Networks," filed Mar. 7, 2017.
U.S. Appl. No. 62/598,409, titled "Evolving Multitask Neural Network Structure," filed Dec. 13, 2017.
U.S. Appl. No. 62/627,161, titled "From Nodes to Networks: Evolving Recurrent Neural Networks," filed Feb. 6, 2018.
U.S. Appl. No. 62/627,658, titled "From Nodes to Networks: Evolving Recurrent Neural Networks," filed Feb. 7, 2018.
Unpublished Article, Modular Universal Reparameterization: Deep Multi-Task Learning Across Diverse Domains, 10 pp.
U.S. Appl. No. 13/184,307—Office Action dated Mar. 21, 2014, 38 pages.
U.S. Appl. No. 13/945,630—Response to Final Office Action dated Aug. 4, 2015 filed Nov. 4, 2015, 12 pages.
U.S. Appl. No. 14/539,908—Response to Office Action dated Oct. 1, 2015 filed Feb. 1, 2016, 18 pages.
U.S. Appl. No. 14/595,991—Office Action dated May 10, 2017, 32 pages.
U.S. Appl. No. 15/794,905—Non Provisional Application filed Oct. 26, 2017, 60 pages.
U.S. Appl. No. 15/794,913—Non-Provisional Application filed Oct. 28, 2017, 73 pages.
Utech, J., et al., "An evolutionary algorithm for drawing directed graphs," Proc. of the Int. Conf. on Imaging Science, Systems and Technology, 8 pages, 1998.
Valsalam, V.K., et al., "Using Symmetry and Evolutionary Search to Minimize Sorting Networks," Journal of Machine Learning Research 14, The University of Texas at Austin, Department of Computer Science, Copyright Sep. 2013, pp. 303-331.
Wissner-Gross, et al., "Causal Entropic Forces," Physical Review Letters, PRL 110.168702, American Physical Society, Apr. 19, 2013, 5 pages.
Xu, et al., "Inference of Genetic Regulatory Networks With Recurrent Neural Network Models Using Particle Swarm Optimization," Missouri University of Science and Technology, Oct. 2017, 36 pages, [retrieved on Feb. 14, 2019], Retrieved from the Internet: http://scholarsmine.mst.edu/cgi/viewcontent.cgi?article=1751&context=ele_comeng_facwork.
Yang et al., "Deep multi-task representation learning: A tensor factorisation approach," arXiv preprint arXiv:1605.06391 (2016), 12 pages.
"CS 224D: Deep Learning for NLP, Lecture Notes: Part IV", 12 pp., Spring, 2015, 12 pages.
"CS 224D: Deep Learning for NLP, Lecture Notes: Part V", 6 pp., Spring, 2015, 6 pages.
"Revisiting Knowledge Distillation: A Teacher-Free Framework," ICLR 2020, 15 pp.
"CS 224D: Deep Learning for NLP, Lecture Notes: Part III". 14 pp., Spring, 2016.
Jun. 22, 2011 Office Action in U.S. Appl. No. 12/267,287, 16 pp.
Aug. 1, 2012 Office Action in U.S. Appl. No. 13/443,546, 12 pp.
Aditya Rawal and Risto Miikkulainen, "From Nodes to Networks: Evolving Recurrent Neural Networks," GECCO '18, Jul. 15-19, 2018, 8 pages, Kyoto, Japan.
Ajjad Abbasi, et al., "Modeling Teacher-Student Techniques in Deep Neural Networks for Knowledge Distillation," Computer Science, 2020 International Conference on Machine Vision and Image Processing (MVTP), 2020, 6 pp.
Al-Haj Baddar, "Finding Better Sorting Networks," Dissertation to Kent State University for PhD, May 2009, 86 pages.
Alesawy et al., Elliptic Curve Diffie-Hellman Random Keys Using Artificial Neural Network and Genetic Algorithm for Secure Data over Private Cloud, Inform. Technol. J., 15 (3): 77-83, 2016 (thru ResearchGate); Total p. 9 (Year: 2016).
Alex Castrounis, Innoarchtech, "Production vs. Development AI and Machine Learning," published by O'Reilly Media, Copyright InnoArchiTech LLC 2020, 24 pages.
Alex Castrounis, Innoarchtech, "Advanced Analytics Packages, Frameworks, and Platforms," 29 pages, published by O'Reilly Media, Copyright InnoArchiTech LLC 2020.
Alex Castrounis, Innoarchtech, "Python vs. R for AI, Machine Learning, and Data Science," published by O'Reilly Media, Copyright InnoArchiTech LLC 2020, 27 pages.
Atin Sood, et al., "NEUNETS: An Automated Synthesis Engine For Neural Network Design," arXiv: 1901.06261v1, Jan. 17, 2019, 14 pp.
AU 2010241594—Examination Report dated Oct. 8, 2013, 3 pages.
AU 2010241597—Examination Report dated Nov. 4, 2013, 4 pages.
Barret Zoph, et al, "Neural Architecture Search With Reinforcement Learning," arXiv: 1611.01578v2, Feb. 15, 2017, 16 pp.

(56) References Cited

OTHER PUBLICATIONS

Bergstra, et al., (2013), "Hyperopt: A Python Library for Optimizing the Hyperparameters of Machine Learning Algorithms," Proceedings of the 12th Python in Science Conference (SCIPY 2013).
Bilen et al. "Integrated Perception with Recurrent Multi-Task Neural Networks", NIPS, 2016, pp. 9.
Bilen,et al., "Integrated perception with Reccurrent Multi-Task Neural Networks," NIPS 2016 ,9 pp.
Bredeche et al., "On-Line , On-Board Evolution of Robot Controllers", Artifical Evolution: 9th International Conference, Evolution Artificielle , EA, Strasbourg, France, vol. 5975, (20090000), pp. 110-121, URL: https://dl.acm.org/citation.cfm?id=1883723. 1883738, (Mar. 15, 2019), XP019146179.
Bredeche, Nicolas, et al., "On-line, on-board evolution of robot controllers," International Conference on Artificial Evolution, Springer, Berlin, Heidelberg, 13 pages, 2009.
Canadian Examination Report issued in App. No. CA3129731, dated Oct. 24, 2022, 4 pages.
Caruana, R. Multitask learning. In Learning to learn, pp. 95-133. Springer US, 1998, (Year: 1998).
Chenglin Yang, et al., "Snapshot Distillation: Teacher-Student Optimization in One Generation," arXiv: 1812.00123vl, Dec. 1, 2018, 10 pp.
Cruz-Ramirez et al, 2011, "Selecting the Best Artificial Neural Network Model from a Multi-Objective Differential Evolution Pareto Front" (Year: 2011).
Cruz-Ramirez, 2010, "Memetic pareto differential evolutionary artificial neural networks to determine growth multi-classes in predictive microbiology" (Year: 2010).
Cui et al, Oct. 2018, "Evolutionary Stochastic Gradient Descent for Optimization of Deep Neural Networks" (Year: 2018).
Deb, et al., "A fast and elitist multiobjective genetic algorithm: NSGA-II," IEEE Transactions on Evolutionary Computation, 6(2), 2002, pp. 182-197.
Derrick Mwiti, "Research Guide: Model Distillation Techniques For Deep Learning" [online], Nov. 20, 2019 [retrieved on Oct. 5, 2020], 17 pp., Retrieved From the Internet: https://heartbeat.fritz.ai/research-guide-model-distillation-techniques-for-deep-learmng-4al00801c0eb.
Devin, Coline, et al., "Learning Modular Neural Network Policies For Multi-Task and Multi-Robot Transfer," arXiv: 1609.07088vl, Sep. 22, 2016, 8 pp.
Di Gao, et al., "Private Knowledge Transfer via Model Distillation with Generative Adversarial Networks," arXiv: 2004.0463lvl, Apr. 5, 2020, 8 pp.
Dong, "Multi-Task Learning for Multiple Language Translation," In Proc. of ACL, pp. 1723-1732, 2015.
E. Meyerson and R. Miikkulainen, "Beyond Shared Hierarchies: Deep Multitask Learning Through Soft Layer Ordering," ICLR, 14 pages, 2018.
Esparcia-Alcazar et al. "Evolving Recurrent Neural Network Architectures by Genetic Programming", 1997, pp. 6, https://citeseerx.ist.psu.edu/viewdoc/download?doi=10.1.1.40.226&rep=rep1&type=pdf.
Fernando et al., "Pathnet: Evolution channels gradient descent in super neural networks," arXiv preprint arXiv:1701.08734 (2017), 16 pages.
Francon et al., "Effective Reinforcement Learning through Evolutionary Surrogate-Assisted Prescription", ACM, Jul. 12, 2020, retrieved on [Oct. 11, 2022]. Retrieved from the internet <URL: https://dl.acm.org/doi/pdf/10.1145/3377930.3389842>.
Garcia-Pedrajas et al., "COVNET: A Cooperative Coevolutionary Model for Evolving Artificial Neural Networks", IEEE Transactions on Neural Networks, vol. 14, No. 3, (2003). (Year: 2003) 22 pages.
Garcia-Pedrajas, et al., "Cooperative Coevolution of Artificial Neural Network Ensembles For Pattern Classification," IEEE Transactions on Evolutionary Computation, vol. 9, No. 3, 32 pages, Jun. 3, 2005.
Garcia-Pedrajas, et. al., "Cooperative-Coevolution-of-Artificial-Neural-Networks", 2005, 32 pages.
Garciarena et al, Jul. 2018, "Evolved GANs for generating Pareto set approximations" (Year: 2018).
Gaurav Kumar Nayak, et al., "Zero-Shot Knowledge Distillation in Deep Networks," arXiv: 1905.08114vl, May 20, 2019, 17 pp.
Golovin, e tal., "Google Vizier: A Service for Black-Box Optimization," Proceedings of the 23rd ACM SIGKDD International Conference on Knowledge Discovery and Data Mining, pp. 1487-1495, 2017.
Gomes et al., "Devising Effective Novelty Search Algorithms: A Comprehensive Empirical Study," Madrid, Spain, Copyright Jul. 11-15, 2015, ACM, 8 pages.
Gomes et al., "Evolution of Swarm Robotics Systems with Novelty Search," published in Swarm Intelligence, vol. 7, Issue 2, ANTS Special Issue, Copyright Sep. 2013, pp. 115-144.
Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.
Gonzalez, et al., "Evolving Loss Functions With Multivariate Taylor Polynomial Parameterization," Version 2, published arXiv: 2002.00059v2), Feb. 10, 2020, 8 pages.
Gonzalez, et al., "Evolving Loss Functions With Multivariate Taylor Polynomial Parameterizations," Version 1, published arXiv: 2002.00059v1, Jan. 31, 2020. 12 pages.
Gonzalez, et al., "Optimizing Loss Functions Through Multivariate Taylor Polynomial Parameterization," Version 3 (published arXiv:2002.00059v3), Jun. 6, 2020, 13 pages.
Gupta et al., "An Overview of methods maintaining Diversity in Generic Algorithms," International Journal of Emerging Technology and Advanced Engineering, vol. 2, Issue 5, New Delhi, India, May 2012, pp. 56-60.
Yang Fan, et al., "Learning to Teach," ICLR 2018, arXiv: 1805.03643vl, May 9, 2018, 16 pp.
Yin et al., "ABCNN: Attention-Based Convolutional Neural Network for Modeling Sentence Pairs", Transactions of the Association for Computational Linguistics, (Dec. 16, 2015), vol. 4, pp. 259-272, XP081355040.
Zhang, et al., "Evolutionary Computation Meets Machine Learning: A Survey," IEEE Computational Intelligence Magazine, vol. 6, No. 4, DOI 10.1109/MCI.2011.942584, 2011.
Zhang, Loy, "Facial Landmark Detection by Deep Multi-Task Learning," In Proceedings of ECCV'14, 2014, 15 pages.
H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.
Haitong Li, "Exploring Knowledge Distillation of Deep Neural Networks for Efficient Hardware Solutions," CS 230 Final Report, Department of Electrical Engineering, Stanford, CA, 6 pp., 2018.
Hansen, et al., "Completely derandomized self-adaptation in evolution strategies," Evolutionary Computation, vol. 9, No. 2, pp. 159-195, 2001.
Hanting Chen, et al., "Data-Free Learning of Student Networks," arXiv: 1904.01186v4, Dec. 31, 2019, 9 pp.
Hodjat et al., "Maintenance of a Long Running Distributed Genetic Programming System for Solving Problems Requiring Big Data", In: Riolo et al., Genetic Programming Theory and Practice XI, Mar. 10, 2014, Genetic and Evolutionary Computation, pp. 65-83 (Year: 2014).
Hodjat et. al., "nPool: Massively Distributed Simultaneous Evolution and Cross-Validation in EC-Star", ppt at GPTP May 2015, 16 pages.
International Preliminary Report on Patentability for PCT App. PCT/US2019/061198,dated Nov. 18, 2020, 24 pp.
International Search Report and Written Opinion for Application No. PCT/US2018/064520, dated Mar. 4, 2019. 8 pages.
International Search Report and Written Opinion for PCT App. No. PCT/US19/61198, dated Mar. 11, 2020, 15 pp.
International Search Report and Written Opinion for PCT Application No. PCT/US18/64428, dated Mar. 26, 2019, 12 pp.
International Search Report and Written Opinion for PCT Application No. PCT/US18/65472, dated Mar. 27, 2019, 8 pp.
International Search Report and Written Opinion for PCT Application No. PCT/US18/66610, dated Apr. 15, 2019, 8 pp.

(56) References Cited

OTHER PUBLICATIONS

International Search Report and Written Opinion for PCT Application No. PCT/US2019/017175, dated Jun. 5, 2019, 10 pp.
International Search Report and Written Opinion issued in App. No. PCT/US2022/032656, dated Nov. 4, 2022, 9 pages.
J. Z. Liang, et al., "Evolutionary Architecture Search For Deep Multitask Networks," GECCO, 2018.
J.T. Barron, "A General and Adaptive Robust Loss Function," arXiv: 1701.03077, 2018, 19 pages.
Jaemin Yoo, et al., "Knowledge Extraction With No Observable Data," 33rd Conference on Neural Information Processing Systems (NeurIPS 2019), Vancouver, Canada, 2019, 10 pp.
Jaimes & Coello, 2005, "MRMOGA: Parallel Evolutionary Multiobjective Optimization using Multiple Resolutions" (Year: 2005).
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.
Jason Liang, et al., "Evolutionary Neural AutoML for Deep Learning," GECCO '19, Jul. 13-17, 2019, Prague, Czech Republic (https://arxiv.org/pdf/1902.06827.pdf).
Jee-weon Jung, et al, "Distilling the Knowledge of Specialist Deep Neural Networks in Acoustic Scene Classification," Detection and Classification of Acoustic Scenes and Events 2019, New York, New York, Oct. 25-26, 2019, 5 pp.
Ji Wang, et al., "Private Model Compression via Knowledge Distillation," arXiv: 1811.05072vl, Nov. 13, 2018, 9 pp.
Jin & Sendhoff, 2008, "Pareto-Based Multiobjective Machine Learning: An Overview and Case Studies" (Year: 2008).
JP 2010-533295—Office Action, dated Apr. 16, 2013, 3 pp. (English translation). 3 pages.
JP 2012-508660—Office Action dated Apr. 1, 2014, 8 pages.
JP 2012-508663—Office Action dated Apr. 1, 2014, 6 pages.
Jul. 27, 2012 Final Office Action in U.S. Appl. No. 12/267,287, 14 pp.
Julian G. Zilly, Rupesh Kumar Srivastava, Jan ICoutnik, and Jurgen Schniidhuber, "Recurrent Hiehwav Networks." CORR abs/1607.03474. 2016 (Arxiv: 1607.03474} 13 pages.
Jun. 16, 2011 Written Opinion from Singapore Patent Office in related application SG 201003127—68 pp.
Jun. 16, 2011 Written Opinion from Singapore Patent Office in related application SG 201093127-6, 9 pp.
K. Janocha and W. M. Czarnecki, "On Loss Functions for Deep Neural Networks in Classification," arXiv: 1702.05659, 10 pages, 2017.
Kang, Zhuoliang, et al., "Learning With Whom to Share in Multi-Task Feature Learning," Proceedings of the 28th International Conference on Machine Learning, Bellevue, WA, USA, 2011, 8 pp.
Kenneth O. Stanley and Risto Miikkulainen, "Evolving Neural Networks Through Augmenting Topologies," Evolutionary Computation, 10(2):99-127, 2002.
Kipfer et al., "UberFlow: A GPU-Based Particle Engine," Computer Graphics and Visualization, The Eurographics Association, Copyright 2004, 9 pages.
Krcah, P., et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pp.
Lee, Chi-Ho, et al., "Evolutionary ordered neural network with a linked-list encoding scheme," Proceedings of IEEE International Conference on Evolutionary Computation, IEEE, 5 pages, 1996.
Lehman et al., "Evolving a Diversity of Creatures through Novelty Search and Local Competition," Proceedings of the Genetic and Evolutionary Computation Conference, ACM, New York, NY, 2011, 8 pages.
Lehman et al., "Abandoning Objectives: Evolution through the Search for Novelty Alone," Evolutionary Computation journal, MIT Press, Copyright 2011, pp. 189-223.
Lehman et al., "Efficiently Evolving Programs through the Search for Novelty," Proceedings of the Genetic and Evolutionary Computation Conference, ACM, New York NY, Copyright 2010, 8 pages.
Lehman et al., "Extinction Events Can Accelerate Evolution," PLOS ONE, journal.pone.0132886, Aug. 12, 2015, 16 pages.
Lehman et al., "Overcoming Deception in Evolution of Cognitive Behaviors," University of Texas at Austin, ACM, Jul. 12-16, 2014, 8 pages.
Lehman et al., "Revising the Evolutionary Computation Abstraction: Minimal Criteria Novelty Search," Proceedings of the Genetic and Evolutionary Computation Conference, ACM, Copyright 2010, 8 pages.
Lehman, Joel, et al., "Exploiting Open-Endedness to Solve Problems Through the Search for Novelty," ALIFE, 8 pages, 2008.
Liang, et al, "Population-Based Training for Loss Function Optimization," 10 pages, arXiv:2002.04225vl (Feb. 11, 2020).
Lin Wang, et al., "Knowledge Distillation and Student-Teacher Learning for Visual Intelligence: A Review and New Outlooks," Journal of Latex Class Files, vol. 14, No. 8, Apr. 2020, 38 pp., arXiv: 2004/05937v3, May 4, 2020.
Mahmoudpour et al., Diagnosis of Distributed Denial of Service Attacks using the Combination Method of Fuzzy Neural Network and Evolutionary Algorithm, Indian Journal of Science and Technology, vol. 8(28), DOI: 10.17485/ijst/2015/v8i28/81820, Oct. 2015; pp. 1-7 (Year: 2015).
Meyerson, Elliot, "Discovering Multi-Purpose Modules Through Deep Multitask Learning," Dissertation Presented to the Faculty of the Graduate School of The University of Texas at Austin, Dec. 2018, 275 pp.
Meyerson, et al., "Pseudo-Task Augmentation: From Deep Multitask Learning to Intratask Sharing and Back," arXiv: 1803.04062, 10 pages, 2018.
Miikkulainen et al, Mar. 3, 2017, "Evolving Deep Neural Networks" (Year: 2017).
Gorunescu, et al., "Evolutionary strategy to develop learning-based decision systems, Application to breast cancer and liver fibrosis stadiallization" [online], Jun. 2014 [retrieved on May 21, 2020], Journal of Biomedical Informatics, vol. 49, pp. 1-32, Retrieved from the Internet: https://reader.elsevier.com/reader/sd/pii/S1532046414000173?token=E3DB70CBA3796F20A3C0B08ABA8E0657EED29D4423C65CF9959714AC34AD580F5755F248C38C14CEBE59D726C456A820.
Kaelbling, et al., Reinforcement Learning: A Survey [online], 1996 [retrieved May 21, 2020], Journal of Artificial Intelligence Research, vol. 4, pp. 237-285, Retrieved from the Internet: https://www.cs.cmu.edu/~tom/10701_sp11/slides/Kaelbling.pdf.
International Search Report and Written Opinion for PCT App. No. PCT/US20/25046, dated Jun. 23, 2020, 9 pp.
Robinet et al ("Inducing High-Level Behaviors from Problem-Solving Traces Using Machine-Learning Tools" 2007) (Year: 2007).
Alois Pourchot et. al. , "CEM-RL: Combining evolutionary and gradient-based methods for policy search", arXiv preprint arXiv:1810.01222v3, Oct. 2, 2018. 19 pages.
Open Ai: "Deep Deterministic Policy Gradient—Spinning Up documentation", Nov. 12, 2018, URL: https://web.archive.org/web/20181112044227/https://spinningup.openai.com/en/latest/algorithms/ddpg.html [retrieved on Feb. 15, 2023], 7 pages.
Tobias Peter: "Using Deep Learning as a surrogate model in Multi-objective Evolutionary Algorithms", Jan. 1, 2018, URL:https://www.ci.ovgu.de/is_media/Master+und+Bachelor_Arbeiten/MasterThesis_TobiasPeter-download-p-4614.pdf [retrieved on Feb. 14, 2023], 115 pages.
Extended European Search Report issued in App. No. EP20778409.1 dated Feb. 27, 2023, 11 pages.
Yao & Islam, 2008, "Evolving Artificial Neural Network Ensembles" (Year: 2008).

* cited by examiner

PROCESS AND SYSTEM INCLUDING EXPLAINABLE PRESCRIPTIONS THROUGH SURROGATE-ASSISTED EVOLUTION

CROSS-REFERENCE TO RELATED APPLICATIONS

Cross-reference is made to U.S. patent application Ser. No. 16/831,550, entitled "PROCESS AND SYSTEM INCLUDING AN OPTIMIZATION ENGINE WITH EVOLUTIONARY SURROGATE-ASSISTED PRESCRIPTIONS" filed on Mar. 26, 2020 which claims the benefit of priority to U.S. Provisional Patent Application No. 62/824,909, entitled "OPTIMIZATION ENGINE WITH EVOLUTIONARY SURROGATE-ASSISTED PRESCRIPTIONS" which was filed on Mar. 27, 2019, both of which are incorporated herein by reference in their entireties.

Cross-reference is also made to co-owned U.S. patent application Ser. No. 15/481,992, filed Apr. 7, 2017, entitled "DISTRIBUTED RULE-BASED PROBABILISTIC TIME-SERIES CLASSIFIER," which claims priority to U.S. Provisional Application 62/320,412, filed Apr. 8, 2016, entitled "DISTRIBUTED RULE-BASED PROBABILISTIC TIME-SERIES CLASSIFIER," which are incorporated by reference herein.

Additionally, one skilled in the art appreciates the scope of the existing art which is assumed to be part of the present disclosure for purposes of supporting various concepts underlying the embodiments described herein. By way of particular example only, prior publications, including academic papers, patents and published patent applications listing one or more of the inventors herein are considered to be within the skill of the art and constitute supporting documentation for the embodiments discussed herein.

FIELD OF THE TECHNOLOGY

The technology disclosed relates generally to using evolutionary computation to optimize explainable decision-making strategies. More particularly, surrogate predictor model is trained, e.g., with historical data, and a prescriptor, decision maker rule set, is evolved against the surrogate predictor model.

BACKGROUND

Many organizations in business, government, education, and healthcare now collect significant data about their operations. Such data is transforming decision making in organizations: It is now possible to use machine learning techniques to build predictive models of behaviors of customers, consumers, students, and competitors, and, in principle, make better decisions, i.e. those that lead to more desirable outcomes. However, while prediction is necessary, it is only part of the process. Predictive models do not specify what the optimal decisions actually are. To find a good decision strategy, different approaches are needed. The main challenge is that optimal strategies are not known, so standard gradient-based machine learning approaches cannot be used. The domains are only partially observable, and decision variables and outcomes often interact nonlinearly: For instance, allocating marketing resources to multiple channels may have a nonlinear cumulative effect, or nutrition and exercise may interact to leverage or undermine the effect of medication in treating an illness.

In U.S. patent application Ser. No. 16/831,550, a methodology, referred to herein as Evolutionary Surrogate-assisted Prescriptions (hereafter "ESP") is described for improving and augmenting decision-making. ESP systems are typically used to help decision-makers by providing specific action recommendations for any given context to achieve desired outcomes. As described in U.S. patent application Ser. No. 16/831,550, Neural Network models may be used to map context to actions, i.e. as the Prescriptor, in ESP. This representation, while quite effective, is considered to be a 'black-box' approach. This means that it is very difficult to find out why a certain set of actions were suggested by the model. This inability to understand why certain actions were suggested reduces the trustworthiness of the system. For life and death domains, e.g., medical diagnoses, procedures and prescriptions, police, and military strategies, by way of example, it is important for these systems to be trustworthy and explainable. Moreover, when there are requirements for auditing/bias evaluation, for neural network prescriptors, there is not much that can be done by looking into the weights of those networks.

Additionally, in certain jurisdictions, such as the European Union, individuals have a right to explanation for algorithmic decisions which significantly affect users. That is, users can ask for an explanation of an algorithmic decision that was made about them. See, Goodman et al., European Union (EU) regulations on algorithmic decision-making and a "right to explanation," arXiv:1606.08813v3, August 2016, addressing Article 22 of the EU general data protection regulation (GDRP).

Accordingly, there remains a need in the art for an approach that can improve and augment decision-making, e.g., ESP, that is also capable of being explained, thus improving trustworthiness.

SUMMARY OF EMBODIMENTS

In a first exemplary embodiment, a computer-implemented process for developing an optimized prescriptor model for determining optimal decision policy outcomes for a predetermined domain includes: training a predictor surrogate model; feeding the predictor surrogate model to an evolutionary algorithm framework for evolving a rule-based prescriptor model over multiple generations, wherein candidate rule-based prescriptor models are evaluated using the predictor surrogate model; and further wherein subsequent generations are evolved based on results from prior generations until an optimized rule-based prescriptor model is determined.

In a second exemplary embodiment, a computer-implemented process for finding a decision policy that optimizes a set of outcomes to solve a known policy problem includes: training a predictor model based on known training data including context information (C), actions (A) performed in an included context, and outcome (O); evolving a rule-based prescriptor model with the trained predictor model as a surrogate over a predetermined number of generations; applying a determined elite evolved rule-based prescriptor model at a predetermined interval to a known policy problem to generate new decision policy data in the format (C, A, O); collecting the new decision policy data (C, A, O) and adding the new decision policy data (C, A, O) to the known training data; repeating i. through iv. until a predetermined convergence metric is met.

In a third exemplary embodiment, a computer-readable medium storing instructions that, when executed by a computer, perform a process for developing an optimized prescriptor model for determining optimal decision policy outcomes for a predetermined domain including: training a predictor surrogate model; feeding the predictor surrogate model to an evolutionary algorithm framework for evolving a rule-based prescriptor model over multiple generations, wherein candidate rule-based prescriptor models are evaluated using the predictor surrogate model; and further wherein subsequent generations are evolved based on results from prior generations until an optimized rule-based prescriptor model is determined.

BRIEF SUMMARY OF FIGURES

The embodiments will be described below and reference will be made to the drawings, in which.

DETAILED DESCRIPTION

To empower decision makers with the right information at the right time warrants design and execution of the right set of interventions based on the data and inputs from various sources. In an era of Artificial Intelligence (AI) and now, Evolutionary AI, it is imperative that businesses utilize these enablers to achieve the stated objective in a short span of time. The present embodiments use evolutionary AI. Evolutionary AI is a general name for a group of problem-solving techniques inspired by the theory of biological evolution, such as genetic inheritance, natural selection, recombination, mutation, and survival of the fittest. Techniques in this field are used on problems that have too many variables for traditional algorithms to consider and where the approach to solving a particular problem is not well understood or requires creativity. One skilled in the art is aware of the numerous descriptions in the literature addressing evolutionary AI in its many forms and variations.

There is now significant historical data available on decision making in organizations, consisting of the decision problem, what decisions were made, and how desirable the outcomes were. Using this historical data, it is possible to learn a surrogate model, and with that model, evolve a decision strategy that optimizes the outcomes. The present embodiments implement an explainable ESP (hereafter E-ESP) approach which replaces the neural network prescriptor described in U.S. patent application Ser. No. 16/831,550, to which the present application claims priority, with evolved rules sets.

Through the use of an E-ESP service within an optimization engine, outcomes may be impacted by enhancing decision processes. The Learning Evolutionary Algorithm Framework (LEAF) AI-enables manual decision processes using a prescriptive AI system to create and iteratively enhance recommendations, improving processes and achieving goals in a principled, explainable AI-based manner.

Figure 1:
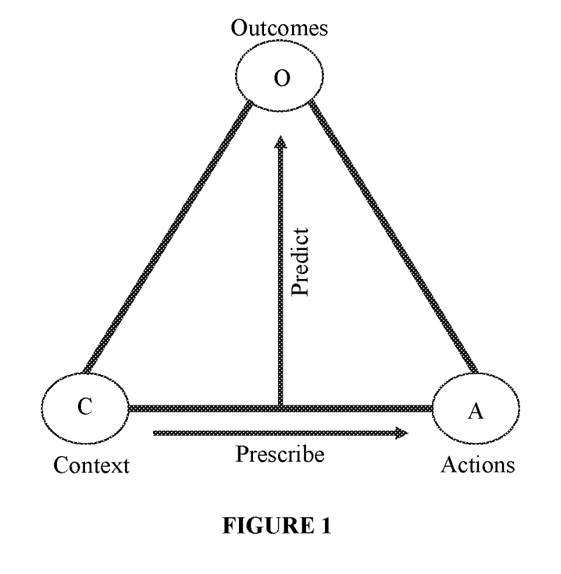
FIG. 1 is a generalized Evolutionary Surrogate-Assisted Prescription ("ESP") model in accordance with an embodiment herein.

At the base of how E-ESP works are the concepts of Context (C), Actions (A), and Outcomes (O) exemplified in the generalized ESP model shown in FIG. 1. The process starts with the building of a predictor surrogate model. The predictor can be a simulator, trained model, or labeled data, which measures accuracy and other desired outcomes as would be known to those skilled in the art. The predictor is then used as a surrogate in order to evolve an explainable prescriptor, i.e. a rule set, that implements a decision policy that results in the best possible outcomes. The majority of evaluations are done on the surrogate, making the process highly sample-efficient and robust, and leading to explainable decision policies that are regularized and therefore generalize well.

The goal of the E-ESP approach is to find a decision policy that optimizes a set of outcomes (FIG. 1). Given a set of possible contexts (or states) C and possible actions A, a decision policy D returns a set of actions A to be performed in each context C:

$$D(C)=A, \quad (1)$$

where $C \in \mathcal{C}$ C and $A \in \mathcal{A}$. For each such (C, A) pair there is a set of outcomes O(C, A), i.e. the consequences of carrying out decision A in context C. For instance, the context might be a description of a patient, actions might be medications, and outcomes might be health, side effects, and costs. In the following, higher values of O are assumed to be better for simplicity.

Figure 2A:
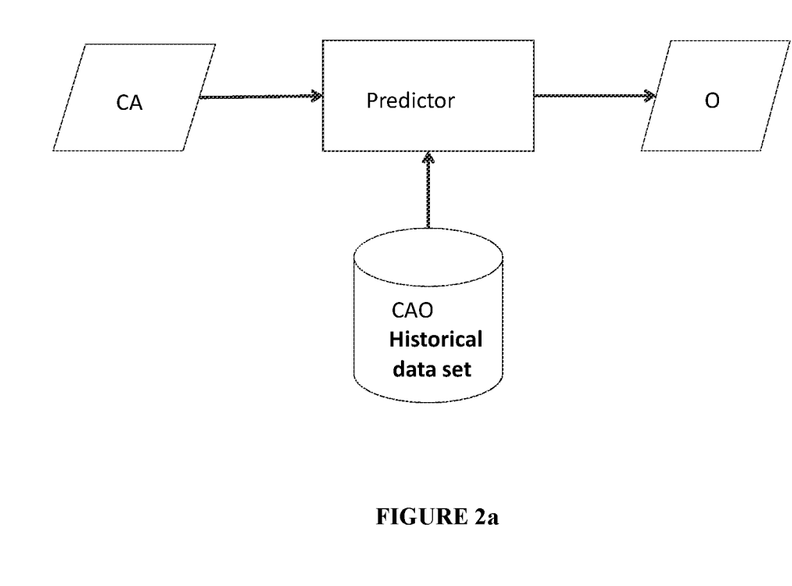
FIGS. 2(a)-2(d) are process flows and system schematics of the ESP algorithm and exemplary system components in accordance with an embodiment herein.

In E-ESP, two models are employed: a Predictor $P_d$, and a Prescriptor $P_s$. As shown in FIG. 2(a), the Predictor takes, as its input, context information (C) (also referred to as domain information), as well as actions (A) performed in that context, along with historical C, A, O data sets. The output of the Predictor is the resulting outcomes when the given actions are applied in the given context. The Predictor is therefore defined as $$P_d(C,A)=O', \quad (2)$$

such that $\Sigma j\ L(Oj, Oj')$ across all dimensions j of O is minimized. The function L is an accuracy measure or loss function. For example, with respect to predictors that are trained models such as supervised neural networks or random forests, L can be any of the usual loss functions used in machine learning, such as cross-entropy or mean-squared-error.

Figure 2B:
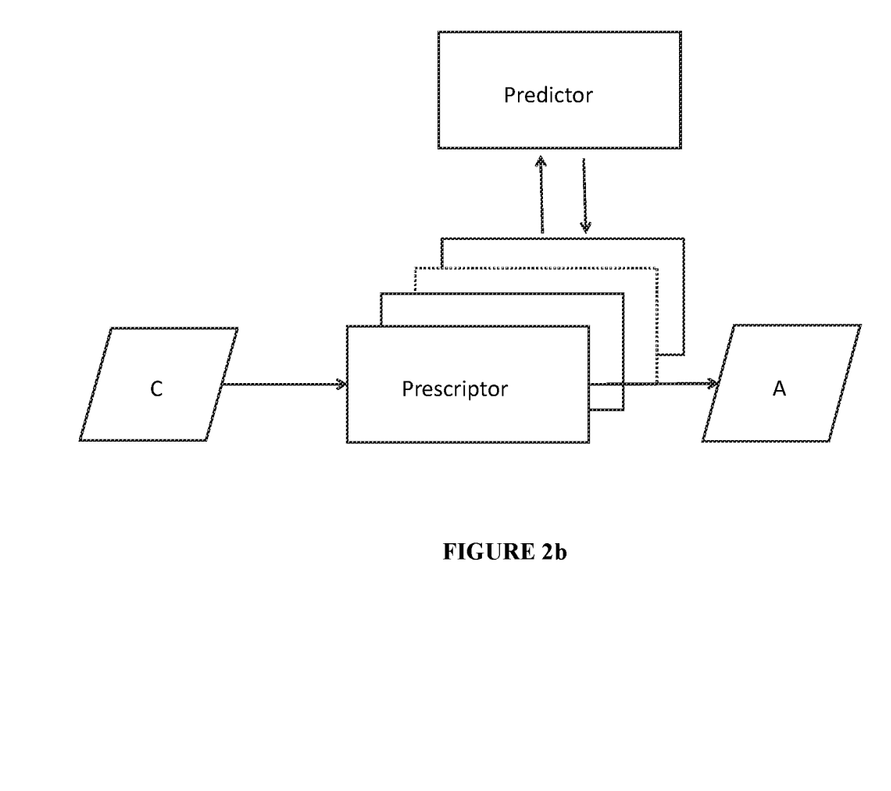
Figure 2C:
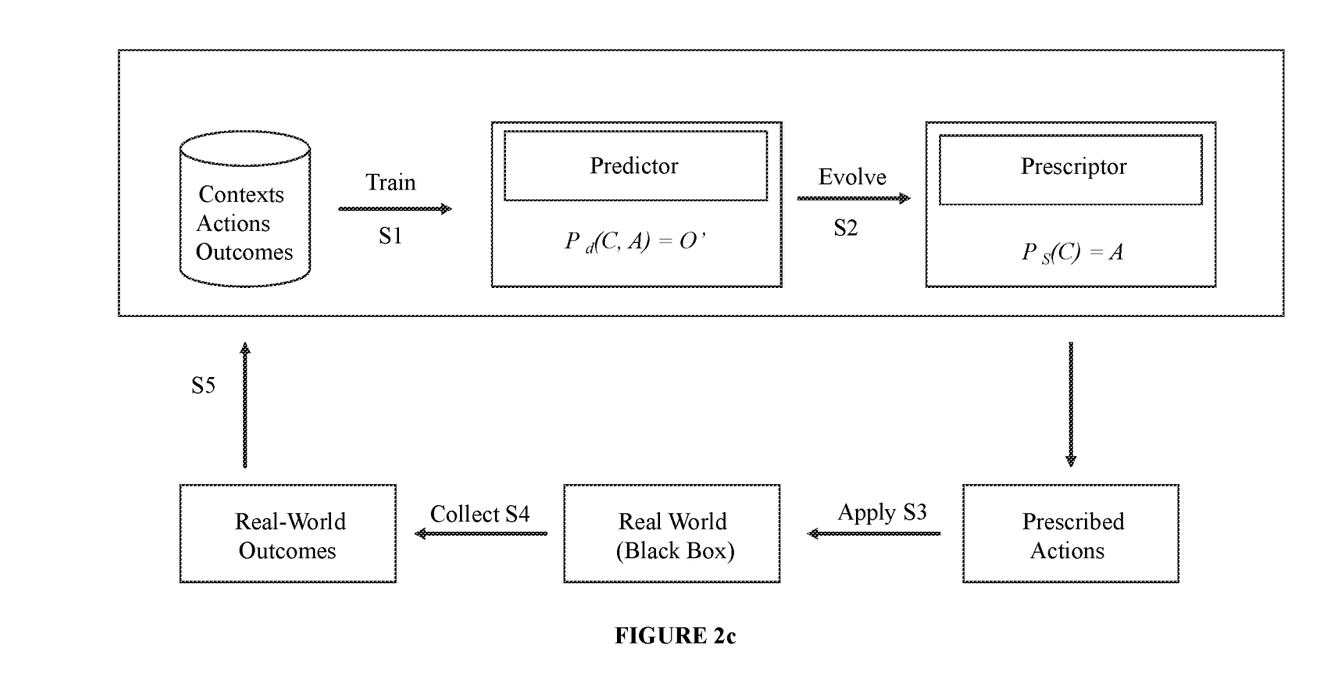

As shown in FIG. 2(b), the Prescriptor takes a given context (C) as input, and outputs a set of actions (A):

$$P_s(C)=A, \quad (3)$$

such that $\Sigma i,j\ Oj'(Ci, Ai)$ over all possible contexts i is maximized. It thus approximates the optimal decision policy for the problem. Note that the optimal actions A are not known, and must therefore be found through search. The ESP algorithm then operates as an outer loop in a continuous learning and optimization process that constructs the predictor and prescriptor models as follows (FIG. 2c):

(1) Train a Predictor based on historical training data; (S1)
(2) Evolve Prescriptors with the Predictor as the surrogate; (S2)
(3) Apply the best Prescriptor in the real world; (S3)
(4) Collect the new data and add to the training set; (S4)
(5) Repeat until convergence. (S5)

As usual in evolutionary search, the process terminates when a satisfactory level of outcomes has been reached, or no more progress can be made. Note that in S1, if no historical decision data exists initially, a random Predictor can be used. Also note that not all data needs to be accumulated for training each iteration. In domains where the underlying relationships between variables might change over time, it might be advisable to selectively ignore samples from the older data as more data is added to the training set in S4. It is thus possible to bias the training set towards more recent experiences.

Figure 2D:
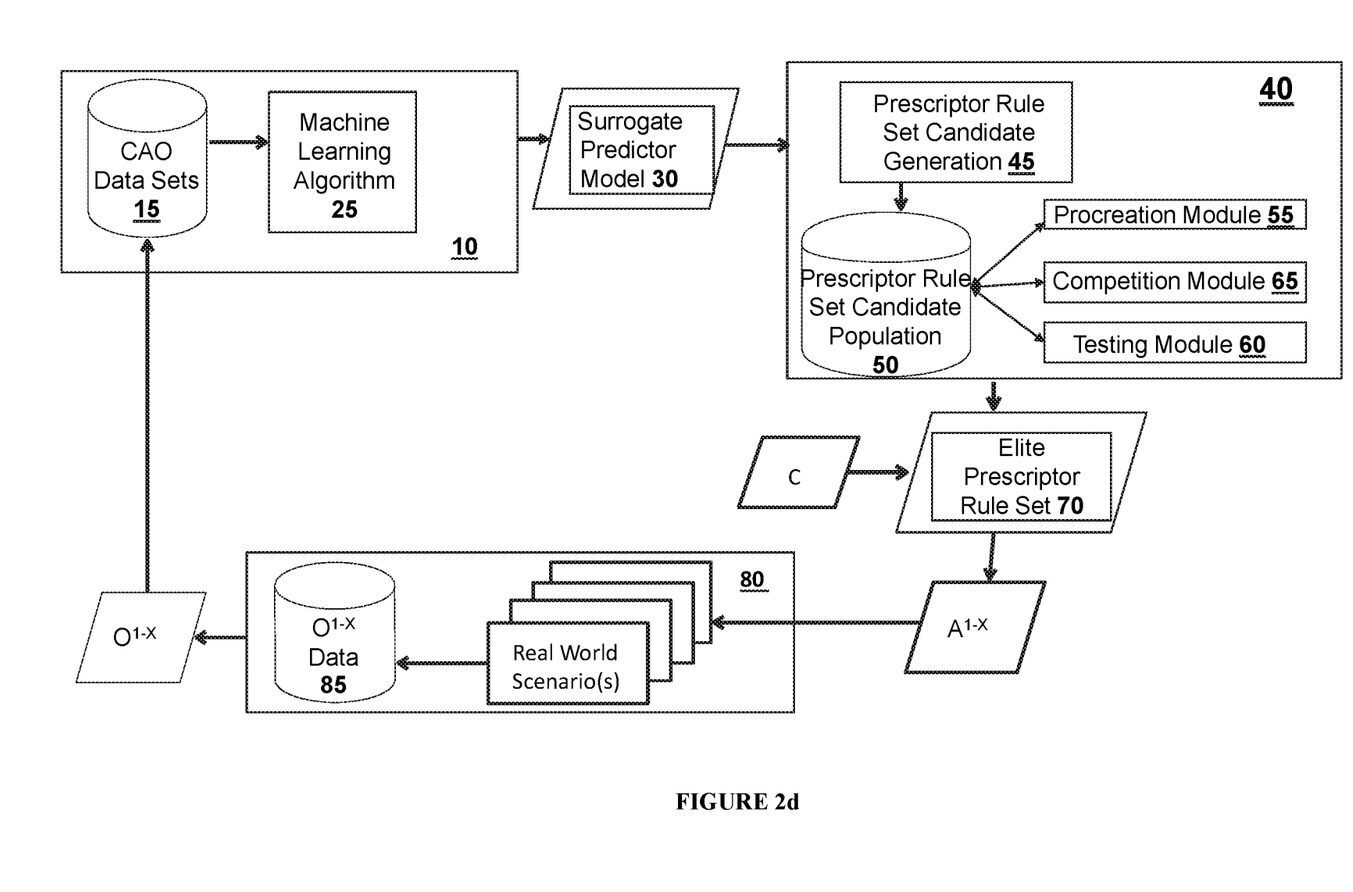

One skilled in the art will appreciate the myriad of system components, including one or more processing units and databases, and configurations which may be employed to implement the processes and subprocesses described herein. FIG. 2d is a schematic of an exemplary system. The overall exemplary system includes a surrogate predictor model generation subsystem 10 which includes at base, a database 20 for storing (C, A, O) training datasets, and at least one module for implementing the selected machine learning algorithm 25, which outputs a trained surrogate predictor model 30. The trained surrogate predictor model is used to evaluate fitness of evolved prescriptor model candidates, i.e., rules sets, as part of the evolution process implemented by the prescriptor evolution subsystem 40. The prescriptor evolution subsystem 40 includes a prescriptor rule set candidate generator 45 and a prescriptor candidate rule set population database 50 which can be continually updated in accordance with evolving rule set candidates. The prescriptor rule set candidates are evaluated for fitness (e.g., accuracy or other desired outcome metrics) against the surrogate predictor model 30 by testing module 60 and ranked or otherwise filtered and compared to one another in accordance with the requirements of a competition module 65. Elite or best candidate prescriptor rule sets 70 are selected for application to real world scenarios by the real world application subsystem 80. A procreation module 55 is used to re-seed and update the prescriptor candidate population database 50 in accordance with known procreation processes. Finally, the outcomes from application of the elite prescriptor rule set 70 actions to real work scenarios can be stored in outcome database 85 and shared with database 20 to update the (C, A, O) training data for the predictor training.

The processes and steps described herein can be implemented using processors programmed using computer programs stored in memory accessible to the computer systems and executable by the processors. As is appreciated by those skilled in the art, additional modules, submodules and processors, servers and databases may be incorporated to perform different or additional tasks, including data processing/filtering/translation as required for different domains and data sources. Steps and functions as described may be implemented in separate hardware or software modules or combined and implemented on a single module. Further, as needed, certain steps can also be implemented on different processor cores or computers, or spread among a number of different processors or computers. Further, aspects of the overall system or subsystems may be performed by different entities. For example, the surrogate predictor model generation subsystem 10 and the prescriptor evolution subsystem 40 may be operated by a service provider and provided as a SaaS product, while the real world application subsystem 80 may be operated exclusively by a customer, thus protecting confidential business and other data. The following co-owned patent applications are incorporated herein by reference herein: U.S. patent application Ser. No. 16/424,686 entitled Systems And Methods For Providing Secure Evolution As A Service and U.S. patent application Ser. No. 16/502,439 entitled Systems And Methods For Providing Data-Driven Evolution Of Arbitrary Data Structures.

For the E-ESP embodiments described herein, building (or identifying) the predictor model, e.g., simulator, trained model, labeled data, is straightforward given a (C, A, O) dataset. The choice of algorithm depends on the domain, i.e., how much data there is, whether it is continuous or discrete, structured, or unstructured.

Figure 3:
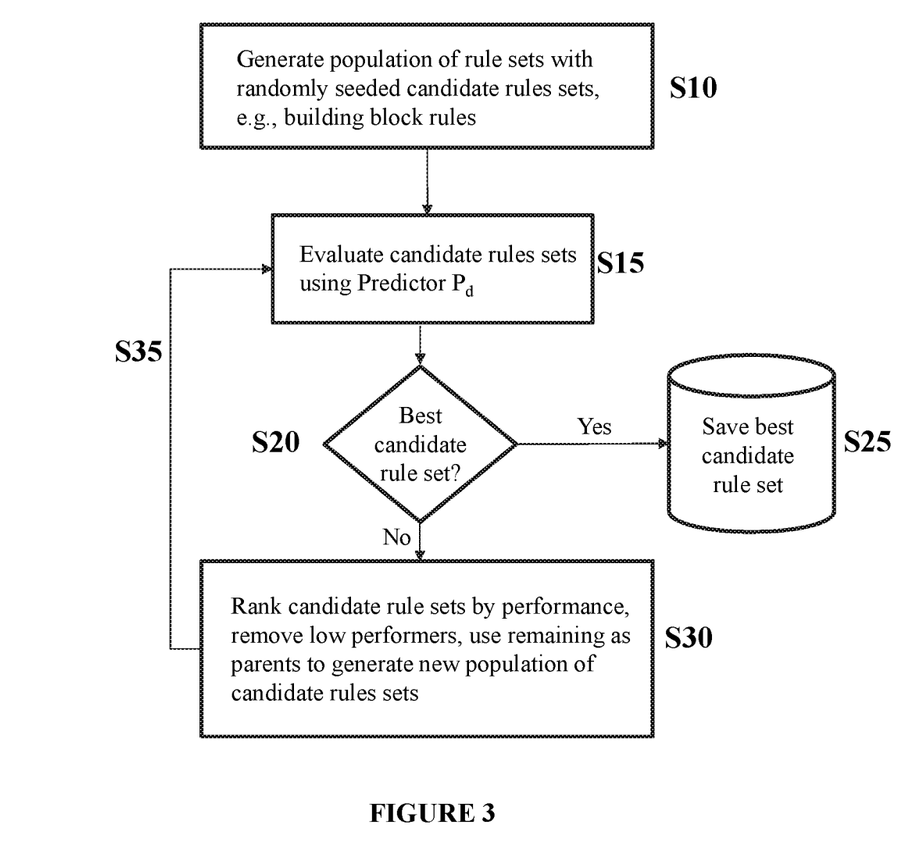
FIG. 3 is a flow chart of the process for prescriptor rule set generation.

In contrast, the prescriptor model, i.e., rule set, in the E-ESP embodiments are developed using evolutionary techniques in accordance with the following high level steps per FIG. 3:

1. Generate a population of randomly seeded candidate rule-sets (called building-block rules) (S10)
2. Evaluate the population of candidate individuals against the predictor (S15) and determine if best candidate rule set identified (S20), if best candidate, save (S25)
3. If best candidate not identified, rank order members of the population, i.e., remove lower performing rule-sets, and use the remainder as parents to use as reference for generating new individuals through reproduction and forming a new population (S30)
4. Go to step 2 above until we get acceptably performing rule-sets, e.g., elite, or best rules set (S35).

One skilled in the art recognizes that variations of well-known evolution functions such as crossover and mutation that are tailored to the rule-set representation may be used as part of the reproduction step. Further, in order to control bloat, reproduction disallows redundancies, falsehoods, and tautologies, in newly created rule-sets. Co-owned U.S. patent application Ser. No. 15/481,992, which is incorporated herein by reference, provides detailed descriptions of the process of evolving rule sets, i.e., using genetic algorithms to extract useful rules and/or relationships from a data set.

The manner by which a rule-set is parsed is important. For problems where a single action is desired as the output of a model, rule-sets can be parsed in order, and the action of the first rule that fires can be considered the output action of the rule-set. In cases where more than one action is desired, all rules are parsed, and each rule that fires is considered as a vote for that rule's action.

In a preferred embodiment, the prescriptor is a set of rules in which a rule is a set of conjoined inequalities called conditions followed by an action in the following general shape:

$$\text{coefficient}_1 * \text{input}_i[\text{lag}_1]$$
$$^{p1}\{<|\leq|>|\geq\}\{\text{coefficient}_2 * \text{input}_j[\text{lag}_2]^{p2}|\text{value}\}$$

where coefficients are numbers between zero and one, $\text{input}_i$ and $\text{input}_j$ are the domain features, p1 and p2 are some integer powers (between 1 and 3 in the current implementation, since in many of the physical domains higher powers of the variables is rare), and lags are referring to values of the system (also called domain) variables in previous time steps.

Each rule has an action which will be prescribed whenever all the rule's conditions become satisfied or evaluate to true. To keep track of how many times a rule sequence evaluates to true, a variable called times applied is incremented.

A rule-set also has a default action which will trigger whenever none of its rules evaluate to true. A rules agent can generally take the follow format:

| | | |
|---|---|---|
| <times_applied_1> | (condition_1_1) (condition_1_2) (condition_1_n) | --> action_1 |
| <times_applied_2> | (condition_2_1) ... (condition_2_m) | --> action_2 |
| ... | ... | ... |

| | | |
|---|---|---|
| <times_applied_k> | (condition_k_1) (condition_k_q) | --> action_k |
| <times_applied_d> | Default Action | --> action_d |

In the following specific examples, the E-ESP process, with the rule set prescriptor is applied to two known problems: Cartpole, also referred to as Inverted Pendulum, and Flappy Bird.

In the Cartpole problem, a pendulum with a center of gravity above its pivot point is unstable, but can be controlled by moving the pivot point under the center of mass. The goal is to keep the cartpole balanced by applying appropriate forces to a pivot point. The E-ESP process provided a very concise and insightful set of rules to push the cart to the left and right by looking at its position and momentum at every moment in accordance with the following Cartpole Rules agent:

| | | |
|---|---|---|
| <22978> | (0.11*Position^3 < 0.87*Momentum) | --> Push-Left |
| <23022> | Default Action | --> Push-Right |

The numbers in < > are the aforementioned times applied counter. In accordance with the previously defined general shape, the coefficients here are 0.11 and 0.87 and there is no lag which means the E-ESP solution did not need to know about the past states of the system. The E-ESP process discovered the relationship between position cubed and the momentum, which is a compact representation of the physical situation. In the present example, it took less than 10 iterations to reach a good rule-set, which is an order of magnitude faster than the neural network generated solution described in, for example, U.S. patent application Ser. No. 16/831,550.

In the Flappy-Bird problem, a side-scrolling game enables a player to control the vertical position of a bird by two actions of flap/no-flap, attempting to fly between columns of green pipes without hitting them. The E-ESP solution for this problem is not as concise, but it is still explainable compared to the black box of neural networks. The E-ESP discovered Flappy-Bird Rules agent is as follows:

range of the feature reported on the rule and in fact, those values are calculated and normalized on the fly without the need for a pre-definition. For example, looking at (0.76*player_vel>-0.9799999999999995 {-8.0 . . . 10.0}), we understand the range of player velocity is from -8 to 10 and it helps us understand which part of that range the condition is targeting.

As exemplified in the examples above, E-ESP, representation of the prescriptors as evolved rule sets in which a rule is a series of conjoined logical inequalities using domain inputs to prescribe different actions opens the door to explain the prescriptor's behavior. This is contrasted with neural network prescriptors, which are essential black boxes. And even though in some domains those rules could turn out to be concise and easy to grasp (e.g., Cartpole), even when they turn out as a long chain of inequalities (e.g., FlappyBird), the rules contain explicit and useful information that can make the models explainable.

In fact, in critical context like medical, military and police domains for example, it is crucial to be able to understand the decision model so that domain experts can make sense of the prescribed actions by the system. When actions are suggested by the rule-set model, by reviewing the human-readable rules, the user is able to understand, among other things: dependency of an action to specific inputs; the dominant domain input in decision making; whether a specific action has a bias to certain domain input; sensitivity of a decision to previous states of the system (time/history sensitivity); and existence of non-linearities in the relationship between the system variables.

The approach described herein can be extended to predict a probability distribution of a domain variable such as probability estimation, e.g., overall probability of an event occurring, such as in medical diagnosis or test evaluation or a patient risk assessment based on readings from bio sensors, etc. Evolution of probability estimation rules sets is disclosed in co-owned U.S. patent application Ser. No. 15/481,

| | | |
|---|---|---|
| <69038> | (0.99*next_pipe_dist_to_player < 0.93*next_next_pipe_bottom_y) | --> No-Flap |
| | (0.99*next_pipe_dist_to_player < 0.83*next_next_pipe_bottom_y) | |
| | (0.98*player_y < = 0.78*next_pipe_bottom_y) | |
| | (0.95*player_y < = 0.65*next_pipe_bottom_y) | |
| | (0.76*player_vel > -0.9799999999999995 {-8.0..10.0}) | |
| | (0.47*next_next_pipe_bottom_y > 0.82*player_vel) | |
| | (0.41*player_y < = 0.78*next_pipe_bottom_y) | |
| | (0.26*next_pipe_top_y < 0.76*player_y) | |
| | (0.17*next_pipe_top_y < = 84.48 {0..192.0}) | |
| <1848> | (0.92*next_pipe_last_to_player < 0.95*next_pipe top_y) | --> Flap |
| | (0.78*next_pipe_bottom_y > = 175.2 {0..292.0}) | |
| | (0.71*next_next_pipe_bottom_y > 0.71*next_pipe_dist_to_player) | |
| | (0.53*next_pipe_top_y < 0.63*next_pipe_dist_to_player) | |
| | (0.49*next_next_pipe_top_y > = 0.12*next_pipe_dist_to_player) | |
| <3041> | (0.95*player_y < = 0.65*next_pipe_bottom_y) | --> No-Flap |
| | (0.76*player_vel > -0.9799999999999995 {-8.0..10.0}) | |
| | (0.47*next_next_pipe bottom_y > 0.82*player_vet) | |
| | (0.41*player_y < = 0.78*next_pipe_bottom_y) | |
| | (0.19*next _pipe_dist_to_player < 0.64*next_pipe_bottom_y) | |
| | (0.17*next_pipe_top_y < = 84.48 {0..192.0}) | |
| <52565> | Default Action | --> Flap |

An additional implementation feature of note is that where the right side of a condition is a number, we have the 992 ('992 application), which is incorporated herein by reference in its entirety. One important representation/implementation difference between the solution in the '992 application and application of the present framework to the problem presented in the '992 Application is that in the '992 application, the atomic conditions can only compare a domain feature to some constant value (Like "Input-i(lag) <ConstantValue-j"), but the solution described in the present embodiments is more expressive. Accordingly, the represented solution is more powerful and can compare different features with each other, as well as find exponent relations between them.

Evolution, which herein refers to evolutionary artificial intelligence technology or evolutionary computation, is a population-based approach. That is, rather than modifying a single solution until it is in an acceptable state (e.g., back-propagating deep networks), the evolutionary computation process in its most general form: generates a population of candidate solutions (initially randomly or using a priori data where available); calculates the fitness of each candidate, removes less fit candidates from the population (e.g., candidate pool) and regenerates new candidate solutions by either randomly tweaking the fitter ones or treating fitter ones as parents and borrowing traits from them and generating new candidates. Thus, evolutionary computation generates a population of models that map a given context (C) to proposed actions (A), and rates the models based on how well they do on the outcomes (O) predicted by the predictor ($P_d$). Additional features, variations and applications of/to evolutionary computation are described in numerous publications known to those skilled in the art, including at least the following commonly assigned patents and patent applications which are incorporated herein by reference in their entireties: U.S. Pat. No. 8,909,570 entitled Data mining technique with experience-layered gene pool; U.S. Pat. No. 8,918,349 entitled Distributed network for performing complex algorithms; U.S. Pat. No. 8,977,581 entitled Data mining technique with diversity promotion; U.S. Pat. No. 9,002,759 entitled Data mining technique with maintenance of fitness history; U.S. Pat. No. 10,268,953 entitled Data mining technique with maintenance of ancestry counts; U.S. Pat. No. 10,430,709 entitled Data mining technique with distributed novelty search. The above-identified list is not exhaustive.

E-ESP is a surrogate-assisted evolutionary optimization method designed specifically for discovering explainable decision strategies in real-world applications. Based on historical data, a surrogate is learned and used to evaluate candidate policies (rule sets) with minimal exploration cost. Extended into sequential decision making, E-ESP is highly sample efficient, has low variance, and low regret, making the policies reliable and safe. As an unexpected result, the surrogate also regularizes decision making, making it sometimes possible to discover good policies even when direct evolution fails. E-ESP is therefore a promising approach to improving decision making in many real world applications where historical data is available.

In addition to the medical, military and police problems reference herein, the following real-world problems may also be addressed using E-ESP: weather, famine, disease prediction; price and incentive optimization; underwriting; web-site optimization; market-mix optimization; subrogation; fleet management; fraud prevention; human resource management, e.g., hiring, on-boarding, performance, training/development, transitions, wherein outcome objectives such as quality, cost, productivity, time-to-hire, time to performance, post on-boarding overhead, performance and retention are weighed; collections, agricultural growth recipe optimization, e.g., computer-controlled hydroponic growth (objectives: light, temperature, water, nutrients), build surrogate model of how plants grow given a recipe, evolve recipe where each new test is used to improve the model, discover size/taste tradeoff, 24-hour light period; optimizing CRISPR guide RNA; refinery optimization; defect detection and the like.

This application cross-references the following patent applications and publications which are incorporated herein by reference in their entireties and are intended to be part of the present disclosure: U.S. Provisional patent application Ser. No. 16/879,934 entitled Quantifying the Predictive Uncertainty of Neural Networks Via Residual Estimation With I/O Kernel; Qiu, X. et al., Quantifying Point-Prediction Uncertainty in Neural Networks via Residual Estimation with an I/O Kernel, In Proceedings of the Eighth International Conference on Learning Representations (ICLR) (2020); Hodjat, B. et al., PRETSL: Distributed Probabilistic Rule Evolution for Time-Series Classification, In Genetic Programming Theory and Practice XIV. Springer, 139-148 (2018); Meyerson, E. et al., Discovering evolutionary stepping stones through behavior domination, In Proceedings of the Genetic and Evolutionary Computation Conference (GECCO 2017); Miikkulainen, R. et al., Sentient ascend: Ai-based massively multivariate conversion rate optimization. In Proceedings of the Thirtieth Innovative Applications of Artificial Intelligence Conference. AAAI (2018); Miikkulainen et al., Ascend by Evolv: AI-Based Massively Multivariate Conversion Rate Optimization, AI Magazine (2019); Johnson et al., "Flavor-Cyber-Agriculture: Optimization of plant metabolites in an open-source control environment through surrogate modeling," PLOS ONE (2019), https://doi.org/10.1371/journal.pone.0213918; Stanley, K. et al, "Designing neural networks through neuroevolution" Nature Machine Intelligence, Vol. 1, p. 24-35 (January 2019).

The invention claimed is:

1. A process for developing an optimized prescriptor model for determining optimal decision policy outcomes for a predetermined domain comprising:

training a predictor surrogate model; and feeding the predictor surrogate model to an evolutionary algorithm framework for evolving a rule-based prescriptor model over multiple generations, wherein the rule-based prescriptor model has a general shape: coefficient$_1$*input$_i$[lag$_1$]$^{p1}$ {<|≤|>|≥} {coefficient$_2$*input$_j$[lag$_2$]$^{p2}$|value}, where coefficients are numbers between zero and one, input$_i$ and input$_j$ are domain features, p1 and p2 are predetermined integer powers, and lags are values of the predetermined domain variables in previous time steps;

wherein candidate rule-based prescriptor models are evaluated using the predictor surrogate model; and further wherein subsequent generations are evolved based on results from prior generations until an optimized rule-based prescriptor model is determined, wherein the optimized rule-based prescriptor model is selected based on a fitness evaluation.

2. The process of claim 1, wherein the predictor surrogate model is trained on historical training data including context information (C), actions (A) performed in an included context, and outcome (O) in data sets (C, A, O).

3. The process of claim 1, wherein the predictor surrogate model is a machine learning model trained with supervised methods.

4. The process of claim 3, wherein the predictor surrogate model is selected from the group consisting of: a trained model, a labeled dataset and a simulator.

5. A process for finding a decision policy that optimizes a set of outcomes to solve a known policy problem, comprising:
  i. training a predictor model based on known training data including context information (C), actions (A) performed in an included context, and outcome (O);
  ii. evolving a rule-based prescriptor model with the trained predictor model as a surrogate over a predetermined number of generations;
  iii. applying a determined elite evolved rule-based prescriptor model at a predetermined interval to a known policy problem to generate new decision policy data in the format (C, A, O);
  iv. collecting the new decision policy data (C, A, O) and adding the new decision policy data (C, A, O) to the known training data;
  v. repeating i. through iv. until a predetermined convergence metric is met;
  wherein the rule-based prescriptor model has a general shape: coefficient$_1$*input$_i$[lag$_1$] $^{p1}$ {<|≤|>|≥} {coefficient$_2$*input$_j$[lag$_2$]$^{p2}$|value}, where coefficients are numbers between zero and one, input$_i$ and input$_j$ are domain features, p1 and p2 are predetermined integer powers, and lags are values of the predetermined domain variables in previous time steps;
  wherein an optimized rule-based prescriptor model is selected based on a fitness evaluation.

6. The process of claim 5, wherein the predictor model is a machine learning model trained with supervised methods.

7. The process of claim 6, wherein the predictor model is selected from the group consisting of a trained model, a labeled dataset and a simulator.

8. A method for storing instructions that, when executed by a computer, perform a process for developing an optimized prescriptor model for determining optimal decision policy outcomes for a predetermined domain comprising:
  training a predictor surrogate model; and
  feeding the predictor surrogate model to an evolutionary algorithm framework for evolving a rule-based prescriptor model over multiple generations,
    wherein the rule-based prescriptor model has a general shape: coefficient$_1$*input$_i$[lag$_1$] $^{p1}$ {<|≤|>|≥} {coefficient$_2$*input$_j$[lag$_2$]$^{p2}$|value}, where coefficients are numbers between zero and one, input$_i$ and input$_j$ are domain features, p1 and p2 are predetermined integer powers, and lags are values of the predetermined domain variables in previous time steps;
    wherein candidate rule-based prescriptor models are evaluated using the predictor surrogate model; and
    further wherein subsequent generations are evolved based on results from prior generations until an optimized rule-based prescriptor model is determined, wherein the optimized rule-based prescriptor model is selected based on a fitness evaluation.

9. The method of claim 8, wherein the predictor surrogate model is trained on historical training data including context information (C), actions (A) performed in an included context, and outcome (O) in data sets (C, A, O).

10. The method of claim 8, wherein the predictor surrogate model is a machine learning model trained with supervised methods.

11. The method of claim 8, wherein the predictor surrogate model is selected from the group consisting of: a trained model, a labeled dataset and a simulator.

* * * * *